United States Patent
Nam et al.

(10) Patent No.: US 11,252,712 B2
(45) Date of Patent: Feb. 15, 2022

(54) METHOD AND APPARATUS FOR CONTROL RESOURCE SET CONFIGURATION FOR COMMON CONTROL

(71) Applicant: Samsung Electronics Co., Ltd., Suwon-si (KR)

(72) Inventors: Young-Han Nam, Plano, TX (US); Youngbum Kim, Seoul (KR); Taehyoung Kim, Seoul (KR); Hongbo Si, Plano, TX (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/805,640

(22) Filed: Feb. 28, 2020

(65) Prior Publication Data
US 2020/0205138 A1 Jun. 25, 2020

Related U.S. Application Data

(63) Continuation of application No. 16/130,970, filed on Sep. 13, 2018, now Pat. No. 10,582,486.
(Continued)

(51) Int. Cl.
*H04W 72/04* (2009.01)
*H04W 56/00* (2009.01)
(Continued)

(52) U.S. Cl.
CPC ......... *H04W 72/042* (2013.01); *H04W 24/08* (2013.01); *H04W 24/10* (2013.01);
(Continued)

(58) Field of Classification Search
CPC ............... H04W 56/001; H04W 24/10; H04W 72/0446; H04W 72/042; H04W 24/08; H04W 48/16
See application file for complete search history.

(56) References Cited

U.S. PATENT DOCUMENTS

| 2015/0063140 | A1* | 3/2015 | Yi | H04L 5/0048 370/252 |
| 2017/0195102 | A1* | 7/2017 | Xiong | H04L 5/0053 |

(Continued)

OTHER PUBLICATIONS

NTT Docomo, Title: Discussion on remaining details on RMSI delivery, Nagoya, Japan, Sep. 18-21, 2017, R1-1716071 3GPP TSG RAN WGI Meeting NR#3.*
(Continued)

*Primary Examiner* — Hashim S Bhatti

(57) ABSTRACT

A user equipment (UE) for receiving control information in a wireless communication system includes a transceiver configured to receive a synchronization signal/physical broadcasting channel (SS/PBCH) block of an index i from a BS, wherein SS/PBCH block comprises a PBCH carrying master information block (MIB). The UE includes a processor configured to for the SS/PBCH block of the index i, determine a slot index $n_0$ as a sum of an offset value and [i*M]. The offset value is determined based on a first value O determined according to the index indicated in the MIB, wherein the index configures PDCCH monitoring occasions, and a second value μ indicated in the MIB, wherein the second value μ represents a subcarrier spacing configuration, wherein M is a positive number determined according to the index indicated in the MIB, and cause the transceiver to decode a PDCCH in the slot index $n_0$.

27 Claims, 23 Drawing Sheets

Related U.S. Application Data

(60) Provisional application No. 62/562,067, filed on Sep. 22, 2017, provisional application No. 62/565,815, filed on Sep. 29, 2017, provisional application No. 62/585,340, filed on Nov. 13, 2017, provisional application No. 62/586,538, filed on Nov. 15, 2017, provisional application No. 62/587,876, filed on Nov. 17, 2017.

(51) Int. Cl.
*H04W 24/08* (2009.01)
*H04W 24/10* (2009.01)
*H04W 48/16* (2009.01)

(52) U.S. Cl.
CPC ..... *H04W 56/001* (2013.01); *H04W 72/0446* (2013.01); *H04W 48/16* (2013.01)

(56) References Cited

U.S. PATENT DOCUMENTS

2019/0069322 A1* 2/2019 Davydov ............ H04W 74/006
2019/0159203 A1* 5/2019 Kim ..................... H04W 56/00
2019/0215123 A1* 7/2019 Zhou .................... H04L 5/0048

OTHER PUBLICATIONS

Supplementary European Search Report in connection with European Application No. 18859845.2 dated Jun. 22, 2020, 13 pages.
Intel Corporation, "Delivery of Remaining Minimum System Information," R1-1704712, 3GPP TSG RAN WG1 Meeting RAN1 #88bis, Spokane, WA, USA, Apr. 3-7, 2017, 3 pages.
Nokia, et al., "Remaining details on NR-PBCH," R1-1716524, 3GPP TSG-RAN WG1 NR AH#3, Nagoya, Japan, Sep. 18-21, 2017, 13 pages.
NTT Docomo, Inc., "Discussion on remaining details on RMSI delivery," R1-1716071, 3GPP TSG RAN WG1 Meeting NR#3, Nagoya, Japan, Sep. 18-21, 2017, 5 pages.
Samsung, "Remaining details on remaining minimum system information delivery," R1-1715910, 3GPP TSG RAN WG1 Meeting NR#3, Nagoya, Japan, Sep. 18-21, 2017, 5 pages.
Vivo, "Discussion on Remaining Minimum System Information," R1-1715608, 3GPP TSG RAN WG1 NR AD-Hoc#3, Nagoya, Japan, Sep. 18-21, 2017, 14 pages.
Zte, et al., "Remaining details of RMSI," R1-1715378, 3GPP TSG RAN WG1 Meeting NR#3, Nagoya, Japan, Sep. 18-21, 2017, 12 pages.
Communication pursuant to Article 94(3) EPC dated Mar. 22, 2021 in connection with European Application No. 18859845.2, 7 pages.
Examination report dated Mar. 24, 2021 in connection with Indian Application No. 202027010544, 7 pages.
European Patent Office, Communication pursuant to Article 94(3) EPC dated Jul. 20, 2021 regarding Application No. 18859845.2, 9 pages.
European Patent Office, Communication pursuant to Article 94(3) EPC dated Dec. 21, 2021 regarding Application No. 18859845.2, 8 pages.

* cited by examiner

FIG. 11

| Slot offset for 15kHz SCS from o_RMSI | 0 | 1 | 2 | 3 | 4 | 5 | 6 | 7 | 8 | 9 |
|---|---|---|---|---|---|---|---|---|---|---|
| slots with CORESETS for 15kHz SCS, with one CORESET per slot (Alt1) | 0 | 1 | 2 | 3 | 4 | 5 | 6 | 7 | 8 | 9 |
| slots with CORESETS for 15kHz SCS, with one CORESET per slot (Alt2) | 0 | 1 | 2 | 3 | 4 | 5 | 6 | 7 | 8 | 9 |
| slots with CORESETS for 15kHz SCS, with two CORESETs per slot | 0 | 1 | 2 | 3 | 4 | 5 | 6 | 7 | 8 | 9 |

| | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| slots with CORESETS for 30kHz SCS, with one CORESET per slot | 0 | 1 | 2 | 3 | 4 | 5 | 6 | 7 | 8 | 9 | 10 | 11 | 12 | 13 | 14 | 15 | 16 | 17 | 18 | 19 |
| slots with CORESETS for 30kHz SCS, with two CORESETs per slot | 0 | 1 | 2 | 3 | 4 | 5 | 6 | 7 | 8 | 9 | 10 | 11 | 12 | 13 | 14 | 15 | 16 | 17 | 18 | 19 | o_RMSI ... o_RMSI + 10msec

FIG. 12

| $o_{RMSI}$ | 0 | 1 | 2 | 3 | 4 | 5 | 6 | 7 | 8 | 9 | $o_{RMSI}$+2.5msec |
|---|---|---|---|---|---|---|---|---|---|---|---|
| Slot offset for 60kHz SCS from $o_{RMSI}$ | | | | | | | | | | | |
| slots with CORESETs for 60kHz SCS, with one CORESET per slot | 0 | 1 | 2 | 3 | 4 | 5 | 6 | 7 | 8 | 9 | - Same pattern repeats up to 8 times |
| slots with CORESETs for 60kHz SCS, with two CORESETs per slot | 0 | 1 | 2 | 3 | 4 | 5 | 6 | 7 | 8 | 9 | - Same pattern repeats up to 4 times |

| | 0 | 1 | 2 | 3 | 4 | 5 | 6 | 7 | 8 | 9 | 10 | 11 | 12 | 13 | 14 | 15 | 16 | 17 | 18 | 19 | |
|---|---|---|---|---|---|---|---|---|---|---|---|---|---|---|---|---|---|---|---|---|---|
| slots with CORESETs for 120kHz SCS, with one CORESET per slot | 0 | 1 | 2 | 3 | 4 | 5 | 6 | 7 | 8 | 9 | 10 | 11 | 12 | 13 | 14 | 15 | 16 | 17 | 18 | 19 | - Same pattern repeats up to 4 times |
| slots with CORESETs for 120kHz SCS, with two CORESETs per slot | 0 | 1 | 2 | 3 | 4 | 5 | 6 | 7 | 8 | 9 | 10 | 11 | 12 | 13 | 14 | 15 | 16 | 17 | 18 | 19 | - Same pattern repeats up to 2 times |

| Signals | SCS | Corres. T/F res | OFDM Symbols | | | | | | | | | | | | | |
|---|---|---|---|---|---|---|---|---|---|---|---|---|---|---|---|---|
| SSB | 15KHz | 20PRBsx4OS | 0 | 1 | 2 | 3 | 4 | 5 | 6 | 7 | 8 | 9 | 10 | 11 | 12 | 13 |
| RMSI CORESETs | 15KHz | 24PRBsx4OS | 0 | 1 | 2 | 3 | 4 | 5 | 6 | 7 | 8 | 9 | 10 | 11 | 12 | 13 |
| RMSI CORESETs | 30KHz | 12PRBsx4OS | 0 1 | 2 3 | 4 5 | 6 7 | 8 9 | 10 11 | 12 13 | | | | | | | |

| Signals | SCS | Corres. T/F res | OFDM Symbols |
|---|---|---|---|
| SSB | 15KHz | 20PRBsx4OS | 0, 1, 2, 3, 4, 5, 6, 7, 8, 9, 10, 11, 12, 13 |
| RMSI CORESETs | 15KHz | 24PRBsx4OS | 0, 1, 2, 3, 4, 5, 6, 7, 8, 9, 10, 11, 12, 13 |
| RMSI CORESETs | 30KHz | 12PRBsx4OS | 0, 1, 2, 3, 4, 5, 6, 7, 8, 9, 10, 11, 12 |

1 CORESET per slot

| Slot offset for 60kHz SCS from oRMSI | 0 | 1 | 2 | 3 | 4 | 5 | 6 | 7 | 8 | 9 |
|---|---|---|---|---|---|---|---|---|---|---|
| slots with CORESETS for 60kHz SCS, with indication #5 is 0 | 0 | | 2 | 3 | 4 | 5 | 6 | 7 | 8 | |
| Corresponding SSBs | 0 | | 2 | | | | | 7 | | |

| Slot offset for 60kHz SCS from oRMSI | 0 | 1 | 2 | 3 | 4 | 5 | 6 | 7 | 8 | 9 |
|---|---|---|---|---|---|---|---|---|---|---|
| slots with CORESETS for 60kHz SCS, with indication #5 is 1 | 0 | | 2 | 3 | 4 | 5 | 6 | 7 | 8 | |
| Corresponding SSBs | 0,1 | | | 3 | | | | | 8 | |

- Same pattern repeats up to 8 times

| slots with CORESETS for 120kHz SCS, with indication #5 is 0 | 0 | 1 | 2,3 | | 4,5 | | 6,7 | | 8,9 | | 10,11 | | 12,13 | | 14,15 | | 16,17 | 18,19 |
|---|---|---|---|---|---|---|---|---|---|---|---|---|---|---|---|---|---|---|
| Corresponding SSBs | 0 | 1 | | | | | | | | | | | | | 15 | | | |

- Same pattern repeats up to 4 times

| slots with CORESETS for 120kHz SCS, with indication #5 is 1 | 0,1 | 2,3 | 4,5 | 6,7 | 8,9 | 10,11 | 12,13 | 14,15 | 16,17 | 18,19 |
|---|---|---|---|---|---|---|---|---|---|---|
| Corresponding SSBs | 0,1 | | 4,5 | 6,7 | 8,9 | | 12,13 | | 16,17 | 18,19 |

- Same pattern repeats up to 2 times

FIG. 15BB

METHOD AND APPARATUS FOR CONTROL RESOURCE SET CONFIGURATION FOR COMMON CONTROL

CROSS-REFERENCE TO RELATED APPLICATIONS AND CLAIM OF PRIORITY

This application is a continuation of U.S. patent application Ser. No. 16/130,970, filed on Sep. 13, 2018, which claims priority to U.S. Provisional Patent Application No. 62/562,067, filed on Sep. 22, 2017; U.S. Provisional Patent Application No. 62/565,815, filed on Sep. 29, 2017; U.S. Provisional Patent Application No. 62/585,340, filed on Nov. 13, 2017; U.S. Provisional Patent Application No. 62/586,538, filed on Nov. 15, 2017; and U.S. Provisional Patent Application No. 62/587,876, filed on Nov. 17, 2017. The contents of the above-identified patent documents are incorporated herein by reference.

TECHNICAL FIELD

The present application relates to configuring control resource set for common and/or specific control information in next generation wireless communication systems.

BACKGROUND

5th generation (5G) mobile communications, initial commercialization of which is expected around 2020, is recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3×, support for up to 500 kilometer per hour (km/h) mobility, 1 millisecond (ms) latency, a connection density of 106 devices/km2, a network energy efficiency improvement of 100× and an area traffic capacity of 10 Mb/s/m2. While all the requirements need not be met simultaneously, the design of 5G networks may provide flexibility to support various applications meeting part of the above requirements on a use case basis.

SUMMARY

The present disclosure relates to a pre-5th-Generation (5G) or 5G communication system to be provided for supporting higher data rates beyond 4th-Generation (4G) communication system such as long term evolution (LTE). Embodiments of the present disclosure provide multiple services in advanced communication systems.

In one embodiment, a user equipment (UE) for receiving control information in a wireless communication system is provided. The UE includes a transceiver configured to receive a synchronization signal/physical broadcasting channel (SS/PBCH) block of an index i from a base station (BS), wherein SS/PBCH block comprises a PBCH carrying master information block (MIB), and a processor configured to, for the SS/PBCH block of the index i, determine a slot index $n_0$ as a sum of an offset value and [i*M], wherein the offset value is determined based on: a first value O determined according to an index indicated in the MIB, pdcch-ConfigSIB1, wherein the index configures physical downlink control channel (PDCCH) monitoring occasions; and a second value µ indicated in the MIB, wherein the second value µ represents a subcarrier spacing configuration, wherein M is a positive number determined according to pdcch-ConfigSIB1; and cause the transceiver to decode a PDCCH in the slot index $n_0$.

In a second embodiment, a base station (BS) for transmitting control information in a wireless communication system is provided. The BS includes a processor configured to, for a synchronization signal/physical broadcasting channel (SS/PBCH) block of an index i, configure a slot index $n_0$ as a sum of an offset value and [i*M], wherein SS/PBCH block comprises a PBCH carrying master information block (MIB), wherein the offset value is determined based on: a first value O determined according to an index indicated in the MIB, pdcch-ConfigSIB1, wherein the index configures physical downlink control channel (PDCCH) monitoring occasions, and a second value µ indicated in the MIB, wherein the second value µ represents a subcarrier spacing configuration, wherein M is a positive number determined according to the pdcch-ConfigSIB1, and a transceiver configured to transmit the SS/PBCH block of the index i, and a PDCCH in the slot index $n_0$ to a user equipment (UE).

In a third embodiment, a method for receiving control information in a wireless communication system is provided. The method includes receiving a synchronization signal/physical broadcasting channel (SS/PBCH) block of an index i from a base station (BS), wherein SS/PBCH block comprises a PBCH carrying master information block (MIB), and for the SS/PBCH block of the index i, determining a slot index $n_0$, as a sum of an offset value and [i*M], wherein the offset value is determined based on: a first value O determined according to an index indicated in the MIB, pdcch-ConfigSIB1, wherein the index configures physical downlink control channel (PDCCH) monitoring occasions; and a second value µ indicated in the MIB, wherein the second value µ represents a subcarrier spacing configuration, wherein M is a positive number determined according to the pdcch-ConfigSIB1; and cause a transceiver to decode a PDCCH in the slot index $n_0$.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 11 shows the slots mapped with the control resource set (CORESET) burst set when remaining minimum system information (RMSI) SCS is 15 or 30 kHz according to embodiments of the present disclosure.

FIG. 12 shows the slots mapped with the CORESET burst set when remaining minimum system information (RMSI) subcarrier spacing (SCS) is 60 or 120 kHz according to embodiments of the present disclosure.

FIGS. 13A, 13B, 13C and 13D illustrate CORESET mappings for Frequency Division Multiplexed (FDM'ed) CORESET physical downlink shared channel (PDSCH) with SSBs, according to some embodiments of the present disclosure.

FIGS. 15A, 15BA and 15BB illustrates alternative SIBx CORESET transmission timings according to embodiments of the present disclosure.

DETAILED DESCRIPTION

FIG. 1 through FIG. 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v13.0.0, "E-UTRA, Physical channels and modulation;" 3GPP TS 36.212 v13.0.0, "E-UTRA, Multiplexing and Channel coding;" 3GPP TS 36.213 v13.0.0, "E-UTRA, Physical Layer Procedures;" 3GPP TS 36.214 v14.2.0, "E-UTRA, Physical Layer Measurements;" 3GPP TS 36.321 v13.0.0, "E-UTRA, Medium Access Control (MAC) protocol specification," and 3GPP TS 36.331 v13.0.0, "E-UTRA, Radio Resource Control (RRC) Protocol Specification."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
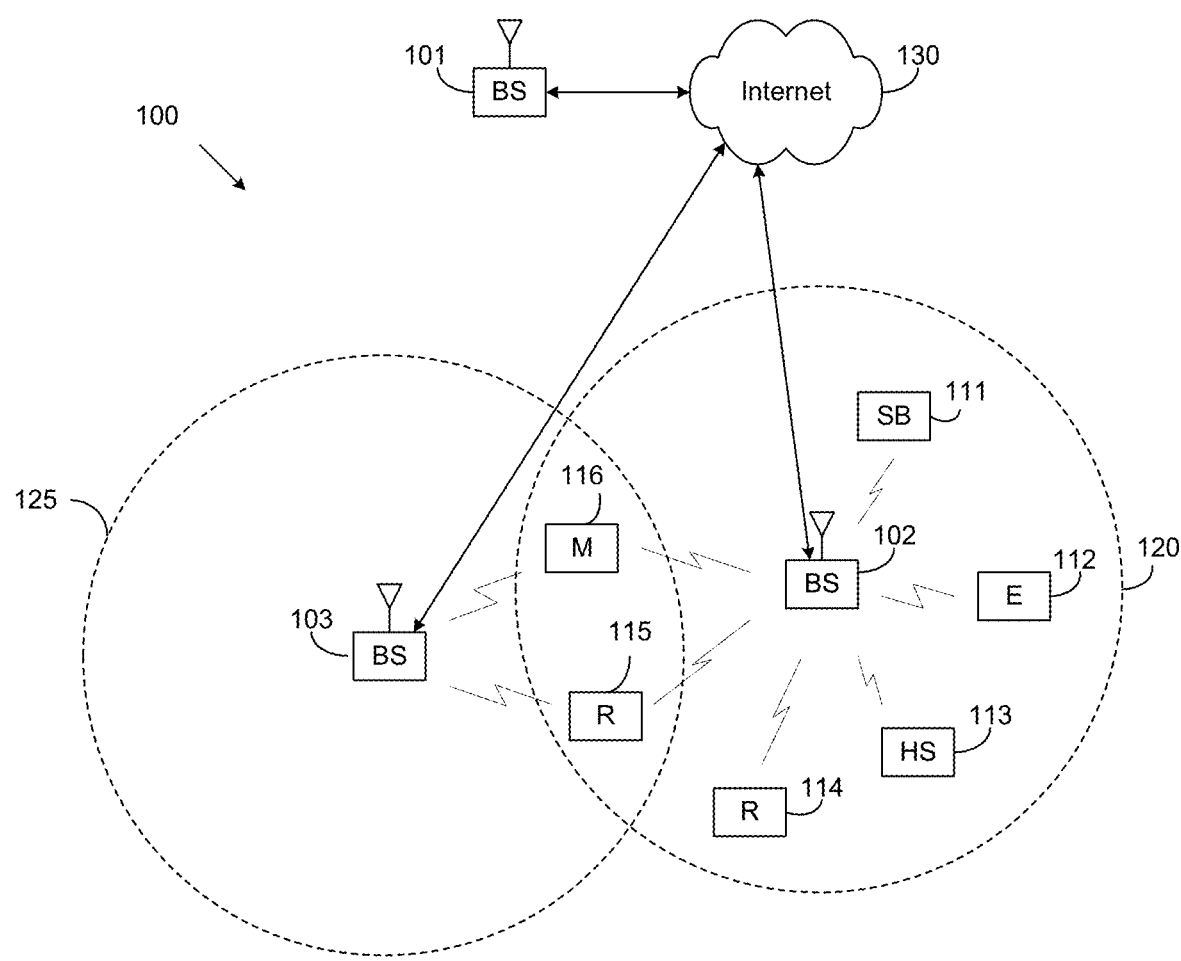
FIG. 1 illustrates an example wireless network according to embodiments of the present disclosure.
Figure 2:
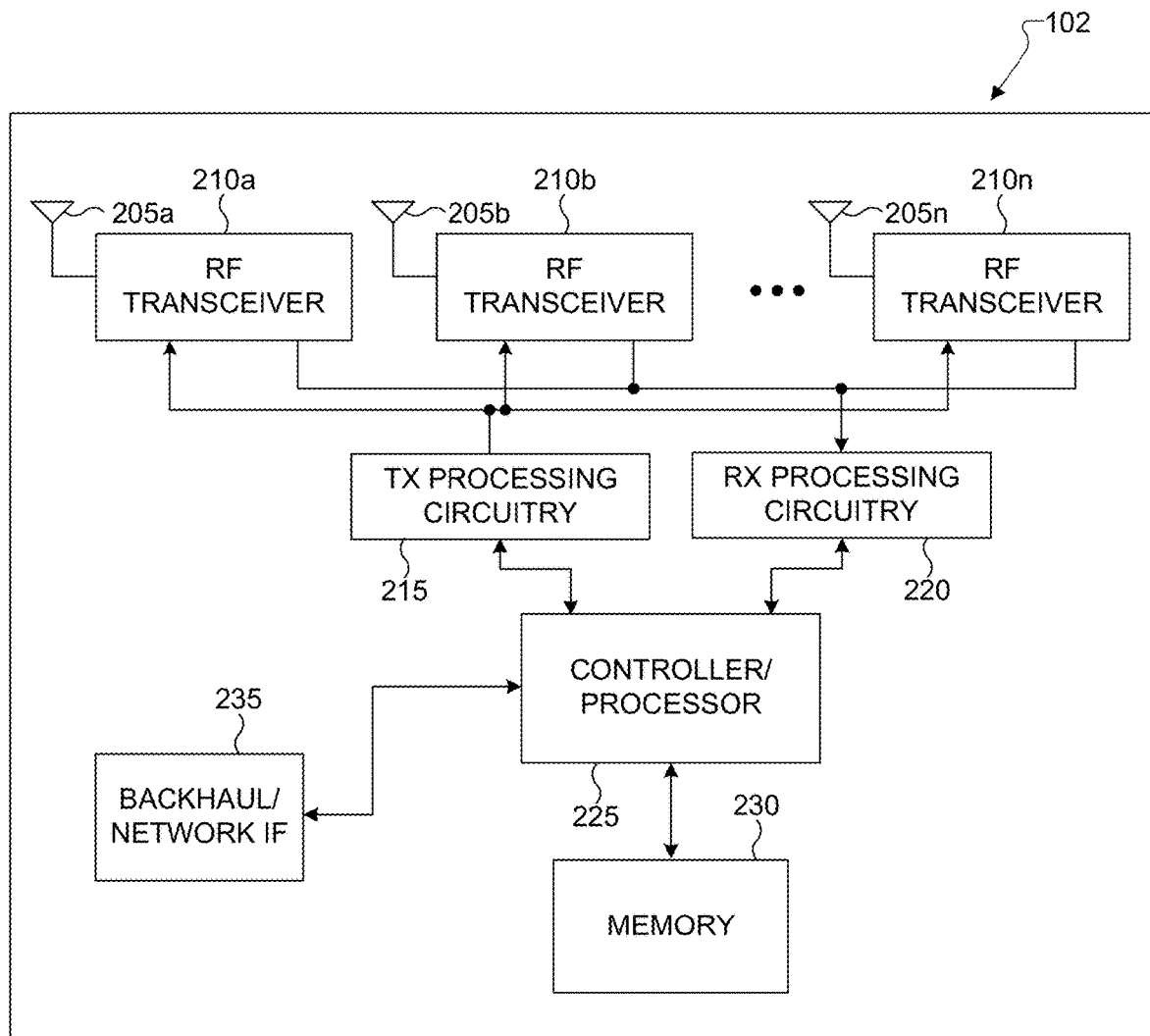
FIG. 2 illustrates an example enhanced NodeB (eNB) according to embodiments of the present disclosure.
Figure 3:
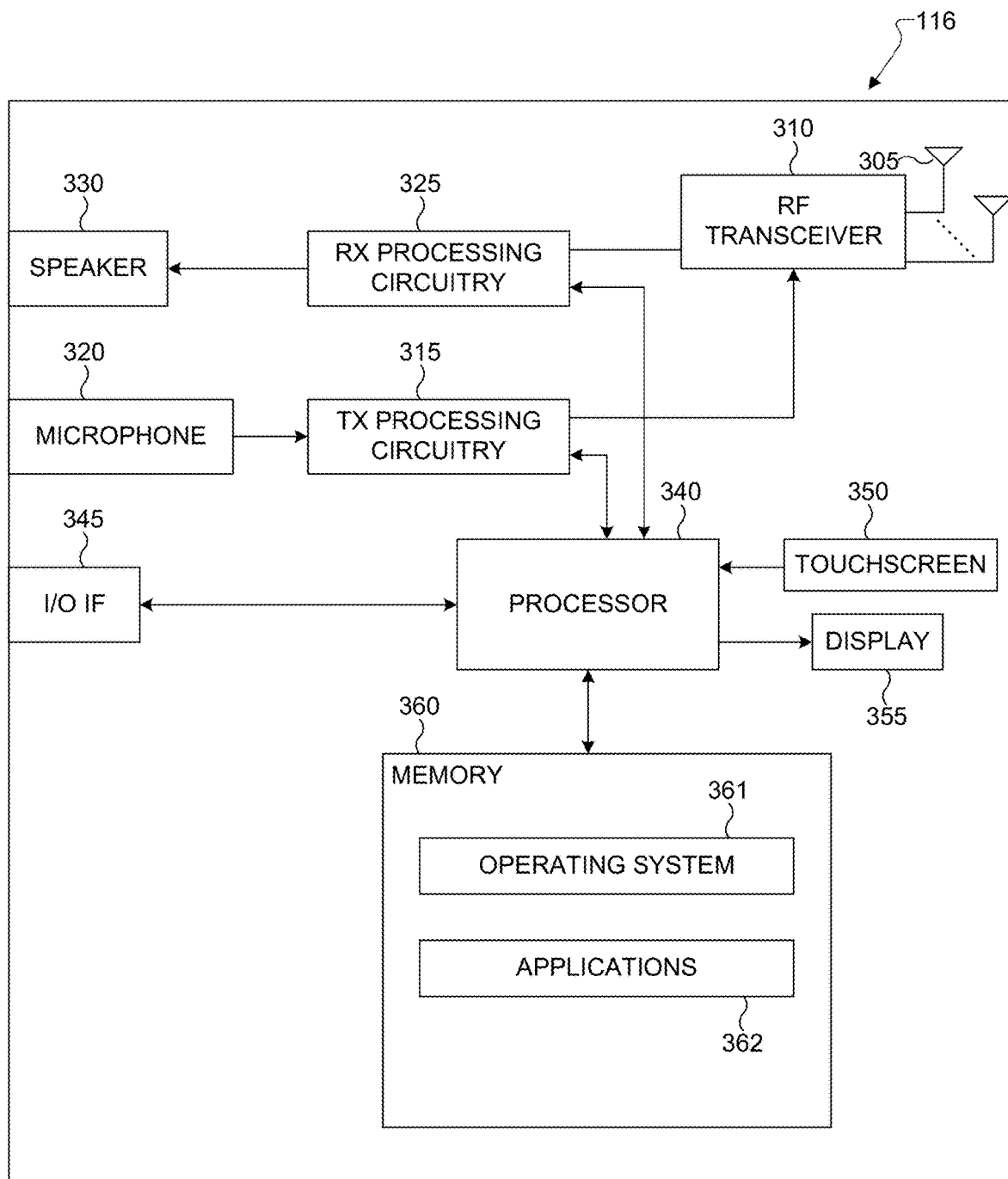
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

According to the legacy long term Evolution® (LTE®) specification, relative received signal strength (RSSI) measurement is performed on Orthogonal frequency-division multiplexing (OFDM) symbols containing CRS if no other indication is provided; and on the DL part of measurement subframes, if measurement subframes are higher-layer configured.

In SS-block based Reference Signal Received Quality (RSRQ) measurement in NR, the direct extension of the method for first case, i.e., "no indication is provided," could be to use the OFDM symbols with SS blocks. However, the OFDM symbols with SS bocks do not provide good representative of the frequency loading condition. Hence, an alternative mechanism for the first case may be necessary.

According to the NR agreements, the UE will know the downlink (DL) part of the subframes via cell-specific RRC configuration (SIB). One possible implication is that one could attempt to design the RSSI measurement resource purely based on the cell-specific indications to keep ensured that the measurement is performed on the DL part only. However, it is noticed that this UL/DL composition information is cell-specific, not carrier specific or cell-common. As RSRQ measurements requires knowledge of neighbor cell's UL/DL composition, the information is insufficient to let UE know the UL/DL compositions of the neighbor cell's UL/DL composition; the information is insufficient for RSRQ measurements for the neighbor cells if the measurement has to be performed on the "actual" DL part only, which could to be cell-specific.

For defining RSSI measurement resource in NR, there are two alternatives—either to define the RSSI measurement resource (Alt 1) without considering whether the resource is DL or UL or both, or only (Alt 2) the DL part of the resource. Alt 1 and Alt 2 have their its own pros and cons, and it is hard to decide one over the other.

One solution is to pre-configure or configure RSSI measurement resource (RMR), and ensure that the RMR is always downlink. To ensure this, the network is not allowed to overwrite the transmission direction to UL. If the network indicates that the transmission direction is uplink (UL) for the RMR, the RMR configuration is prioritized (or supersedes) or the network configuration of transmission direction is overridden by the RMR configuration. UE shall assume that the RMR portion of slot/frame is DL, despite the transmission direction configuration is UL.

Furthermore, the RMR may be explicitly configured in a frequency carrier specific information element carried in SIBx.

When RMR configuration supersedes the transmission direction configuration, and the RMR configuration is carrier specific, the RSSI measurement can be performed only in the DL part.

The RMR can be configured in terms of periodicity, offset and duration similarly to SMTC.

Alternatively, the RMR can be configured as only a time offset, to the starting point of each SMTC duration.

Alternatively, the RMR can be configured as time offset (relative to the starting point of each SMTC duration) and periodicity (e.g., in terms of a multiple of the SMTC periodicity like 1×, 2×, 4×, [½×, ¼×], etc.). The advantage of this alternative is that the channel direction overriding due to RMR can be configured to happen less frequently, which may increase network flexibility of UL/DL configuration.

It may be beneficial if the network has freedom to choose whether to use this overriding behavior or not. Hence, another proposal is:

UE can be indicated whether to over-ride the channel direction configuration with the RMR configuration or not.

If the over-riding is indicated or pre-configured, the user equipment (UE) will assume that RMR is always DL despite the channel direction configuration; UE will not expect to receive UL grant or configuration to transmit PUSCH/PUCCH in RMR, and/or UE shall rate match around the RMR portion if the UE receives a UL grant or configuration whose physical uplink shared channel (PUSCH)/physical uplink control channel (PUCCH) resource allocation includes the RMR. This is referred to "UE behavior 1."

If the over-riding is turned off, the UE will assume that the RMR can also be UL; and hence the UE shall transmit PUSCH/PUCCH in the RMR. When the UE is indicated to transmit PUSCH/PUCCH in a part of RMR duration, the UE cannot use them to measure RSSI. This is referred to "UE behavior 2."

If this overriding configuration is introduced, a default UE behavior will be necessary. The default behavior could be either, given that there are different pros and cons of these two UE behaviors.

This UL behavior on UL transmissions and RSSI measurements may also need to consider SS burst set composition indication which could be given by either RRC or RMSI (i.e., SIB1).

The UL/DL configuration may indicate that time-frequency resource corresponding to an SS block is UL. If the SS block is turned off in both the radio resource control (RRC) and RMSI indicated SS burst set composition, there is not contradicting information. However, it could happen that the SS block is turned on in RRC, RMSI or a separate indication for mobility measurement, but the UL/DL configuration indicates that the resource for the SS block is UL.

During the SMTC window duration in which UE performs measurement on SS blocks based on one of the SSB composition indications, the UL transmissions should be overridden to ensure that the UE performs measurement (i.e., the UL transmissions need to be dropped or rate matched around on the indicated SSB OFDM symbols). On the other hand, outside the SMTC window duration in which UE receives UL/DL data, it could be allowed so that the UE transmits PUSCH/PUCCH on an SS block which is turned on by the indication (i.e., the SMTC configuration is overridden and transmission direction configuration is prioritized).

Alternatively, to ensure that the SS blocks are received without UL interference to all the UEs in the cell, UE always prioritize the SSB composition indication over the UL/DL composition indication. If there is any collision between UL transmission and SSB reception according to the SSB composition indication, the UE shall drop the UL transmissions, or rate match around the UL transmissions around the whole SSB OFDM symbols according to the union of the SSB sets (corresponding to two SSB set composition indications by RMSI, RRC; and may be another indication for mobility measurement purpose).

Alternatively, the UE behavior of transmitting UL signals on turned-on SSBs may further be controlled based on the type of SSB composition indication. For example, outside the SMTC window duration, the UE transmits UL signals on a "turned-on" SSB OFDM symbols based on RMSI indication or mobility measurement purpose indication of the SSB set composition, but the UE is not allowed to transmit UL signals on any of the "turned-on" SSB OFDM symbols based on RRC indication of the SSB set composition.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for system information delivery in an advanced wireless communication system. In certain embodiments, and one or more of the eNBs 101-103 includes circuitry, programming, or a combination thereof, for efficient system information delivery in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for system information delivery in an advanced wireless communication system. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
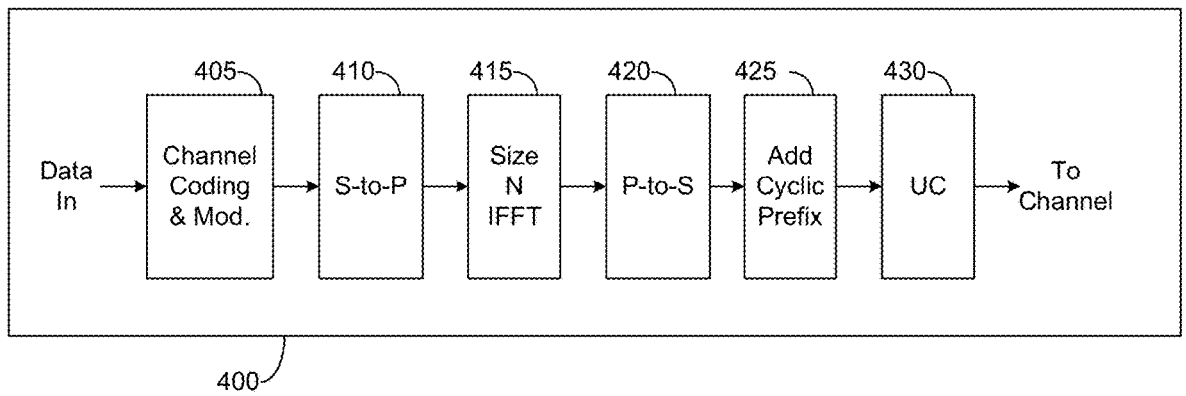
FIG. 4A illustrates an example high-level diagram of an orthogonal frequency division multiple access transmit path according to embodiments of the present disclosure.
Figure 4B:
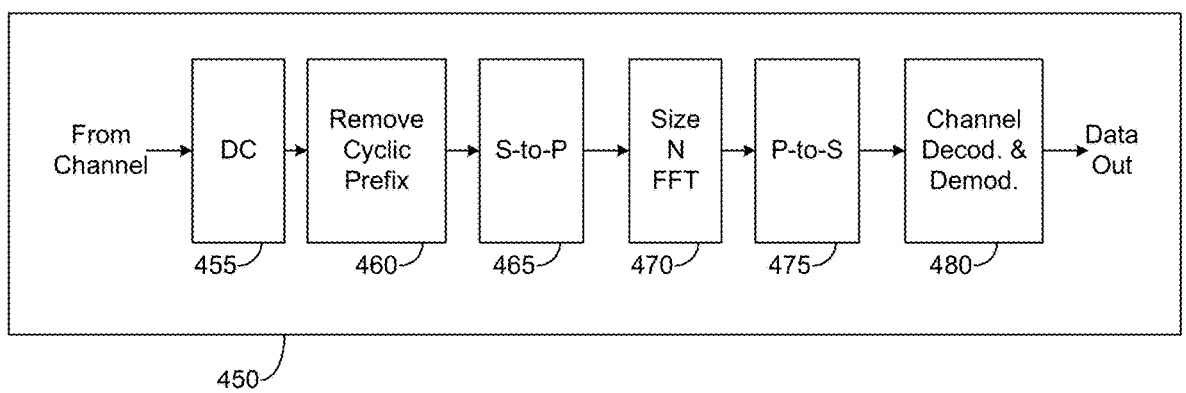
FIG. 4B illustrates an example high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in the BS 102 and the UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

Figure 5:
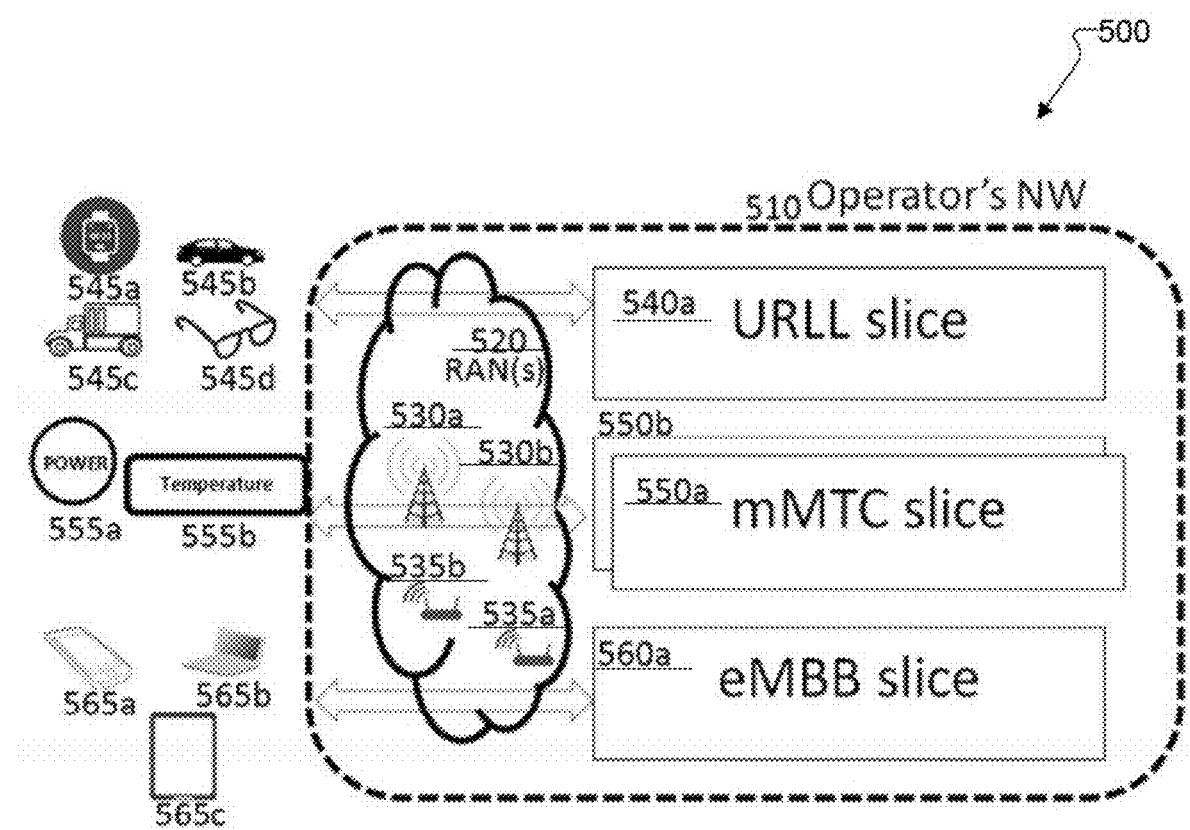
FIG. 5 illustrates an example network slicing according to embodiments of the present disclosure.

FIG. 5 illustrates a network slicing 500 according to embodiments of the present disclosure. An embodiment of the network slicing 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

As shown in FIG. 5, the network slicing 500 comprises an operator's network 510, a plurality of RANS 520, a plurality of eNBs 530a, 530b, a plurality of small cell base stations 535a, 535b, a URLL slice 540a, a smart watch 545a, a car 545b, a, truck 545c, a smart glasses 545d, a power 555a, a temperature 555b, an mMTC slice 550a, an eMBB slice 560a, a smart phone (e.g., cell phones) 565a, a laptop 565b, and a tablet 565c (e.g., tablet PCs).

The operator's network 510 includes a number of radio access network(s) 520—RAN(s)—that are associated with network devices, e.g., eNBs 530a and 530b, small cell base stations (femto/pico eNBs or Wi-Fi access points) 535a and 535b, etc. The operator's network 510 can support various services relying on the slice concept. In one example, four slices, 540a, 550a, 550b and 560a, are supported by the network. The URLL slice 540a to serve UEs requiring URLL services, e.g., cars 545b, trucks 545c, smart watches 545a, smart glasses 545d, etc. Two mMTC slices 550a and 550b serve UEs requiring mMTC services such as power meters and temperature control (e.g., 555b), and one eMBB slice 560a requiring eMBB serves such as cells phones 565a, laptops 565b, tablets 565c.

In short, network slicing is a scheme to cope with various different qualities of services (QoS) in the network level. For supporting these various QoS efficiently, slice-specific PHY optimization may also be necessary. Devices 545a/b/c/d, 555a/b are 565a/b/c examples of user equipment (UE) of different types. The different types of user equipment (UE) shown in FIG. 5 are not necessarily associated with particular types of slices. For example, the cell phone 565a, the laptop 565b and the tablet 565c are associated with the eMBB slice 560a, but this is just for illustration and these devices can be associated with any types of slices.

One device is configured with more than one slice. In one embodiment, the UE, (e.g., 565a/b/c) is associated with two slices, the URLL slice 540a and the eMBB slice 560a. This can be useful for supporting online gaming application, in which graphical information are transmitted through the eMBB slice 560a, and user interaction related information are exchanged through the URLL slice 540a.

In the current LTE standard, no slice-level PHY is available, and most of the PHY functions are utilized slice-agnostic. A UE is typically configured with a single set of PHY parameters (including transmit time interval (TTI) length, OFDM symbol length, subcarrier spacing, etc.), which is likely to prevent the network from (1) fast adapting to dynamically changing QoS; and (2) supporting various QoS simultaneously.

It is noted that "slice" is a terminology introduced just for convenience to refer to a logical entity that is associated with common features, for example, numerology, an upper-layer (including medium access control/radio resource control (MAC/RRC)), and shared UL/DL time-frequency resources. Alternative names for "slice" include virtual cells, hyper cells, cells, etc.

Figure 6:
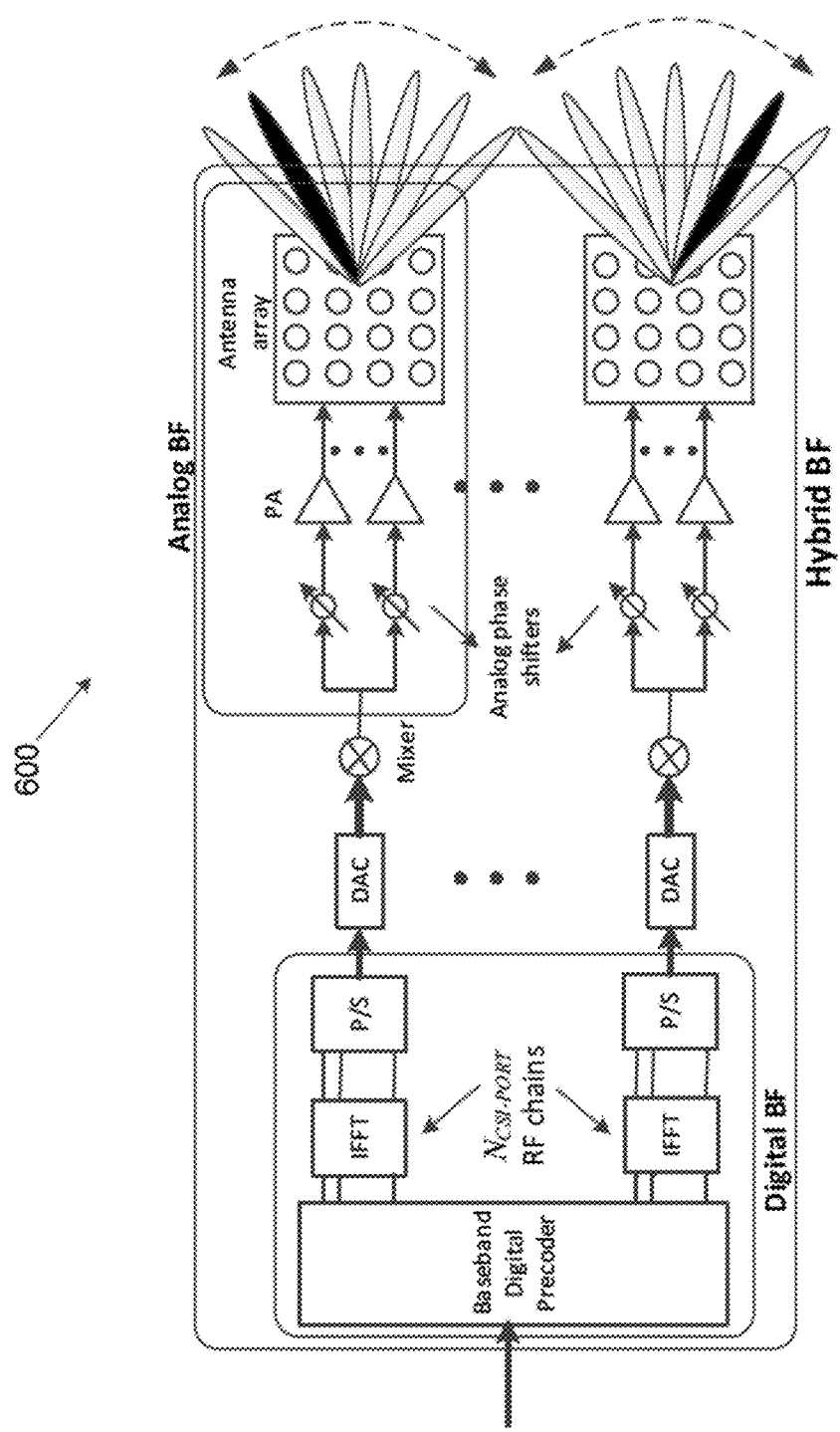
FIG. 6 illustrates an example number of digital chains according to embodiments of the present disclosure.

FIG. 6 illustrates a number of exemplary digital chains 600 according to embodiments of the present disclosure. An embodiment of the number of digital chains 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

For mmWave bands, the number of antenna elements can be large for a given form factor. However, the number of digitally chain to be limited due to hardware constraints (such as the feasibility to install a large number of ADCs/DACs at mmWave frequencies) as illustrated in FIG. 6. In this case, one digital chain is mapped onto a large number of antenna elements which can be controlled by a bank of analog phase shifters. One digital chain can then correspond to one sub-array which produces a narrow analog beam through analog beamforming. This analog beam can be configured to sweep across a wider range of angles by varying the phase shifter bank across symbols or subframes.

Several embodiments to transmit the minimum system information transmission in an advanced communication are provided in the present disclosure.

In some embodiments, RMSI is transmitted via other channels at least partially indicated by NR-PBCH. In one example, the NR-PBCH carries a part of minimum system information including information necessary for the UE to receive channel carrying RMSI. In another example, the NR-PBCH carries information necessary for the UE to perform initial UL transmission (not limited to NR-PRACH, e.g. PRACH msg. 1) and possibly information necessary to receive the response to initial UL transmission (e.g., PRACH msg. 2) in addition to information in the aforementioned example.

In some embodiments, RMSI is transmitted via other channels not indicated in the NR-PBCH. In one example, the NR-PBCH carries information necessary for the UE to perform initial UL transmission (not limited to NR-PRACH, e.g. PRACH msg. 1) and information necessary to receive the response to initial UL transmission (e.g. PRACH msg. 2). In such example, information necessary to receive RMSI is provided after initial UL transmission.

In some embodiments, the NR-PBCH carries all of minimum system information.

In the LTE specifications, an MIB is periodically broadcast with 40 msec periodicity, SIB-1 is periodically broadcast with 80 msec periodicity, and SIB-2 is also periodically broadcast, whose periodicity is configured by SIB-1.

The MIB uses a fixed schedule with a periodicity of 40 ms and repetitions made within 40 ms. The first transmission of the MIB is scheduled in subframe #0 of radio frames for which the SFN mod 4=0, and repetitions are scheduled in subframe #0 of all other radio frames. For time division duplex/frequency division duple (TDD/FDD) system with a bandwidth larger than 1.4 MHz that supports BL UEs or UEs in CE, MIB transmission may be repeated in subframe #9 of the previous radio frame for FDD and subframe #5 of the same radio frame for TDD.

This disclosure provides configuration/indication of CORESETs for receiving common control channels, such as RMSI, OSI, system information block x (SIBx), random access response (RAR), etc. CORESET configuration is provided via PBCH (or MIB) for at least RMSI scheduling, and another CORESET configuration is provided via RMSI (or SIB1) for at least RAR scheduling. In this disclosure, RMSI refers to SystemInformationBlock1 (SIB1).

A CORESET (control resource set) may be characterized by a slot timing, OFDM symbol numbers in each slot, and frequency resources. These CORESET properties are indicated or pre-configured for each CORESET. For RMSI/SIB scheduling, the CORESET properties are provided in the PBCH. For RAR scheduling, the CORESET properties are provided in the RMSI.

Among these CORESET properties configured by PBCH/RMSI, the OFDM symbol numbers and frequency resources are commonly applicable to all the common channels (e.g., SIBx/RAR, etc.), but the slot timing is specifically determined/indicated for different SIBx/RAR.

In some embodiments, PBCH indicates the following information for the CORESET: #1) frequency resources; #2) OFDM symbol numbers in each slot; and #3) RMSI slot timing e.g., in terms of slot offset and periodicity. Information #1 and #2 can be reused for type 0 CSS, i.e., at least for SIBx transmissions for x>1. Information #3 provided in the PBCH is used only for RMSI transmissions; the slot timing for other SIBx (x>1) is separately indicated. If the LTE principle is reused, the SIB2 slot timing is configured by RMSI, and the rest of the SIBx slot timings are indicated in SIB2.

The type 0 CSS CORESETs characterized by information #1) and #2) can be used for paging and/or RAR as well, along with separately optimizing the slot timing, for reducing specification efforts.

In one embodiment, PBCH indicates the following information for CORESET(s): 1) frequency resources, 2) OFDM symbol numbers in each slot, and 3) slot timing (e.g., in terms of slot offset and periodicity). Information 1) and 2) are commonly used for OSI and/or paging and/or RAR transmissions, while information 3) is applicable only for RMSI. For OSI (SIBx, x>1), paging, RAR, information 3) is individually determined or indicated.

To configure the multiple CORESETs efficiently with small signaling payload in PBCH, one possible approach is to configure as many common parameters for all the CORESETs as possible. Among the three information elements discussed in an embodiment of this disclosure, information #1) frequency resources can be made common for all the CORESETs (and the common information is indicated in PBCHs of all the SSBs of a cell). On the other hand, it may be necessary to allow for different slot & OFDM symbol timings (i.e., information #2 and #3) for multiplexing the CORESETs in a TDM manner; in this case different information for #2 and #3 may be indicated in PBCHs of different SSBs.

For indicating the timing information, two alternatives can be provided. In a first alternative, each PBCH in an SS burst set contains only common information to configure the multiple CORESETs. The timing of the CORESET to be monitored upon detecting an SSB may be derived with the commonly signaled information and the SSB index. In a second alternative, a PBCH of an SSB in an SSB set contains both common and specific information to configure a CORESET that is QCL'ed with the SSB containing the PBCH. The specific information can be used to further adjust the CORESET timing corresponding to the SSB, thereby more network flexibility can be achieved than the first alternative.

The first alternative may provide more robustness, and allows easier beam switching during the initial cell selection and IDLE mode. If there are PBCHs with the same contents within/across SSBs, UE may be able to soft combine the PBCHs to achieve more reliability. When the UE switches to select another SSB beam due to intra-cell mobility, the UE can figure out an updated CORESET location just relying on the previously decoded MIB, i.e., the UE does not need to decode another MIB in the newly selected SSB again.

The second approach provides more flexibility to the network, but for IDLE mode intra-cell mobility, UE may need to acquire the "specific" information to find the CORESET corresponding to a newly selected SSB than the initially detected SSB. It would not be desirable if UE has to decode a PBCH in the newly selected SSB to acquire the specific information. A better alternative could be the specific information for all the SSBs of a cell is provided cell-specifically in SIBx, so that the UE can identify all the CORESET timing locations of a cell without having to decode individual PBCH. In some embodiments, the specific information is referred to "information about SSB-specific offset", or $\Delta_{ss}$.

In one embodiment, the timing information can be configured according to one of the following two alternatives. In the first alternative, A PBCH in an SSB contains full information to configure all the CSS CORESETs in the cell. The timing of the CORESET corresponding to the selected SSB may be derived with the signaled information and the SSB index. In a second alternative, a PBCH in an SSB contains common information to be used for all the CSS CORESETs in the cell; and also specific information to be used for identifying the location of a CORESET that corresponds to (or is QCL'ed with) the SS block containing the PBCH. The specific information can be used to further adjust the CORESET timing corresponding to the SSB, thereby more network flexibility can be achieved than the first alternative.

To minimize fragmentation of the resources, it is desirable to confine these signals to be transmitted with the MIB configured numerology, i.e., MIB configured CORESET, RMSI, RMSI configured CORESET, msg 2/4 for initial access, broadcast OSI, etc., in a localized time-frequency resource. In particular, for the frequency domain, the BW to transmit these signals could comprise a single BW whose BW size is less than the UE minimum BW. Now the remaining issue is whether to additionally support configuration of the single BW separately from the UE minimum BW which encompassing the SS block BW, i.e., whether NR supports FDM between SS block and CORESET/PDSCH. The main arguments to support FDM from an operator was that the OFDM symbols used for SS blocks may not be so useful for any other purposes, if the TRP of a cell has a single TXRU and analog BF constraints are in place; and it may be useful to allow the FDM so that the broadcast information of RMSI can be FDM'ed with the SS blocks in those OFDM symbols. This seems to be a valid argument, and it would be good to address this operator's concern if there is a simple way to support the FDM.

The FDM can be supported by allowing to configure the frequency location for the single BW in terms of frequency offset to the SS block BW. If the candidate frequency offset values to be indicated in the MIB includes '0' and other values corresponding to BWPs non-overlapping with the SS block BW, then both TDM and FDM of the SS block and the single BW will naturally be supported.

Regarding the FDM in addition to TDM of RMSI and SS block, the FDM may require UE to re-tune the RF to receive the RMSI, especially when the aggregated BW of the RMSI and SS block exceeds "UE minimum BW."

Figure 7A:
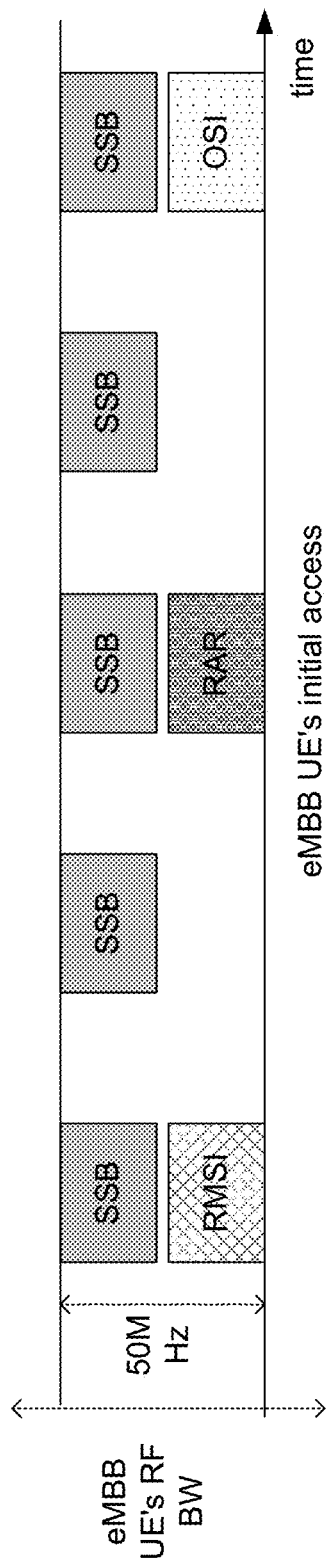
FIG. 7A illustrates an exemplary initial access process for enhanced mobile broadband (eMBB) user equipment (UE)
Figure 7B:
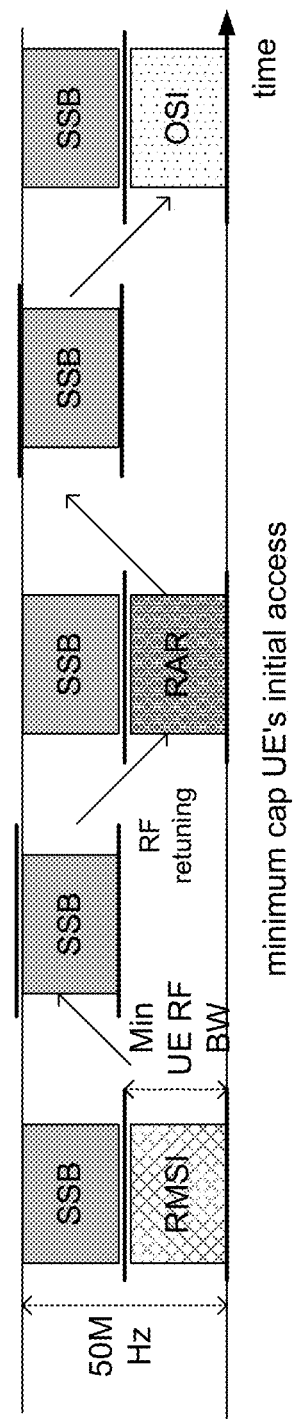
FIG. 7B illustrates an exemplary initial access procedure for a minimum cap UE, according to embodiments of the present disclosure.

FIG. 7A illustrates an exemplary initial access process for eMBB UE, and FIG. 7B illustrates an exemplary initial access procedure for a minimum capability UE, according to embodiments of the present disclosure. The embodiments shown in FIGS. 7A and 7B are for illustration only. Other embodiments are used without departing from the scope of the present disclosure.

Different UEs can support different BWs as a UE capability, and there can be UEs to support only the minimum channel BW for a specific band, e.g., 5 MHz, such as eMTC UEs in LTE. However, it is expected that eMBB UEs are likely to be able to support larger than UE minimum BW. If the combined BW of RMSI and SS block is within 50 PRBs, eMBB UEs are likely to be able to support reception of both RMSI and SS block using a single RF, and correspondingly the frequent RF re-tuning is not likely to be necessary. The minimum capability UEs, however, may have to perform RF retuning to receive SS block and other signals in different BWs. This RF re-tuning operation has been supported for LTE eMTC, and it hence does not seem to be an issue to mandate the RF re-tuning for minimum capability UEs.

For facilitating minimum capability UE's reception of SSBs and other initial access signals, it could be considered such that the intra-frequency SMTC configuration (i.e., periodicity, offset and duration) is provided in the early stage of initial access, e.g., RMSI or SIBx. For the minimum capability UEs, the intra-frequency SMTC duration may be regarded as measurement gap, similarly to the legacy inter-frequency case.

It is noted that BWP is a UE specific concept. Effectively, a UE with minimum capability will see initial active BWP of 25 PRBs corresponding to the BW carrying RMSI, RAR and Open System Interconnection (OSI), and an eMBB UE will see initial active BWP of 50 PRBs, corresponding to the aggregated BW of SSB BW and RMSI/RAR/OSI BW.

When the combined BW size of SSB and RMSI is about 50 PRBs: UEs supporting more than 50-PRB maximum channel bandwidth do not need to perform RF retuning; and UEs supporting only minimum channel BW needs to perform RF retuning for TDM reception of SS blocks and other signals. To facilitate UE's TDM reception of SS blocks, SMTC configuration may be provided early, e.g., in RMSI. The SMTC duration may be regarded as measurement gap.

In one embodiment, an initial-active BW is configured in MIB by means of a frequency offset. The initial-active BW is to transmit these signals according to the MIB configured numerology, i.e., MIB configured CORESET, RMSI, RMSI configured CORESET, msg 2/4 for initial access, broadcast OSI, and the like. The candidate values to indicate the frequency offset include at least {0, +25, −25} PRBs, so that the combined BW of SS block and the initial-active BW is minimized. The number of bits for the frequency offset is limited to 2 bits.

Configuration of CORESET Burst Set Parameters for CSS

Values of some parameters for configuring CORESETs for CSS are fixed, and values of some other parameters are indicated in the MIB.

Frequency information parameters may include number of PRBs (e.g., BW) for CORESETs for CSS and the frequency location in a minimum carrier BW. Note that it is desirable to confine and configure CORESETs for CSS within a minimum carrier BW to avoid too many retuning by the UE. This configuration is likely to be common across all the SS blocks, and includes the following information contents. The number of PRBs (e.g., BW): Given that the minimum carrier BWs are 5 MHz (for below 6 GHz) and 50 MHz (for below 6 GHz), the candidate PRB allocation for the CORESET would be limited or even further fixed to the minimum carrier BW. To save signalling overhead, it is proposed to use a fixed BW of 25 PRBs. Frequency location: a 2-bit information is used to indicate a PRB offset for the CORESET/RMSI and other signals with respect to the SS block frequency.

Timing information parameters may include periodicity, slot location, OFDM symbol numbers. The information contents are summarized below.

Periodicity: For the CSS, the periodicity does not need to be explicitly configured in PBCH. It is noted that for individual SIBx, this periodicity and SSB-common slot offset can be signalled or predefined in the spec.

Slot location: The CSS CORESETs may come as a burst set similarly to SSB set, and each CSS CORESET slot location corresponding to SSB $i_{ss}$ can be determined as $n_s = o_{common} + f(n_{ss}, i_{ss}, \Delta_{ss})$. Here, the notation $f(n_{ss}, i_{ss}, \Delta_{ss})$ implies that the resulting value of $f(n_{ss}, i_{ss}, \Delta_{ss})$ is at least partly dependent upon at least one of $n_{ss}$, $i_{ss}$, $\Delta_{ss}$. $o_{common}$: a common offset for all the CSS CORESETs (i.e., starting slot number of the CSS CORESET burst set), may be configured in RMSI/OSI, which could be frame, half-frame starting boundary or a slot starting boundary. Note that $o_{common}$ for RMSI CORESETs (i.e., $o_{RMSI}$) needs to be provided in PBCH or predefined in the spec. $i_{ss}$: SSB index, i.e., 0, 1, . . . , L−1, where L is determined band specifically. $n_{ss}$: Slot number to map SSB $i_{ss}$, where the slot number is defined according to the SSB numerology. $\Delta_{ss}$: information about SSB-specific offset provided in the PBCH. The value of this parameter may be SSB specific, i.e., different values may be indicated in different SSBs.

OFDM symbol indices: OFDM symbols in a slot for a CORESET that should be monitored when UE detects an SSB $i_{ss}$. The symbol indices need to be indicated in MIB. The OFDM symbol indices may be determined depending at least partly on number of CORESETs per slot and the SSB & RMSI numerology/SCS. The number of CORESETs to be mapped per slot can be one or two [or four], which could be signaled in the PBCH. The decision of the number of CORESETs per slot is network implementation issue, and the NW will determine the number with considering the support of FDM and TDM of RMSI and SS blocks, and the support of slot-based and non-slot based transmissions.

CCE-to-REG mapping: fixed to 'interleaved' only (i.e., no configuration is needed).

REG bundling size: Fixed to be 6.

DMRS BW: Fixed to be WB-RS, i.e., according to option ii) as follows. For a CORESET, precoder granularity in frequency domain is Configurable between option i) equal to the REG bundle size in the frequency domain; or option ii) equal to the number of contiguous RBs in the frequency domain within the CORESET. For option ii), DMRS is mapped over all REGs within the CORESET.

Quasi-CoLocation (QCL): a CORESET corresponding to an SS block is QCL'ed to the SS block. The correspondence is indicated in the PBCH by means of the RMSI CORESET signaling.

PDSCH resource mapping type (slot vs. non-slot): implicitly configured by the number of configured CORESETs per slot. If one, slot-based transmission; if two or more, non-slot based transmissions. The number of configured CORESETs per slot can be implicitly/explicitly indicated in the PBCH.

Configuration of CORESET Burst Set Parameters for RMSI

Frequency information is same as CORESETs for CSS. No additional configuration is necessary.

Timing information includes a periodicity and number of repetitions within RMSI TTI, slot location and OFDM symbol indices.

A periodicity and number of repetitions within RMSI TTI (Timing information): a mini-slot or a full-slot can be used for RMSI PDSCH transmissions. This results in more than 2× coding rate variations on PDSCH used for RMSI, and hence it is necessary to allow variable number of repetitions to support worst case coverage.

Figure 8A:
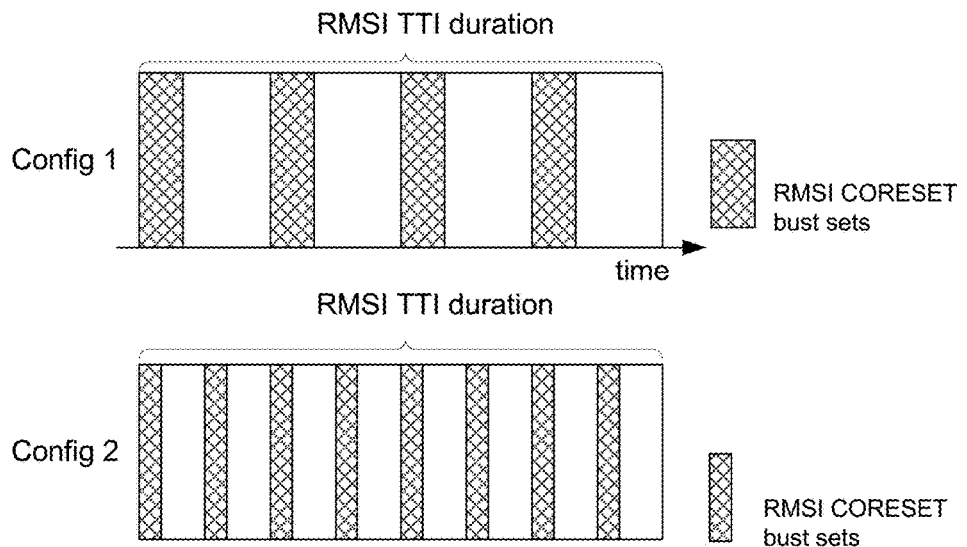
FIGS. 8A and 8B illustrates exemplary methods of signaling of variable number of repetitions to fulfil a desired coverage according to embodiments of the present disclosure.
Figure 8B:
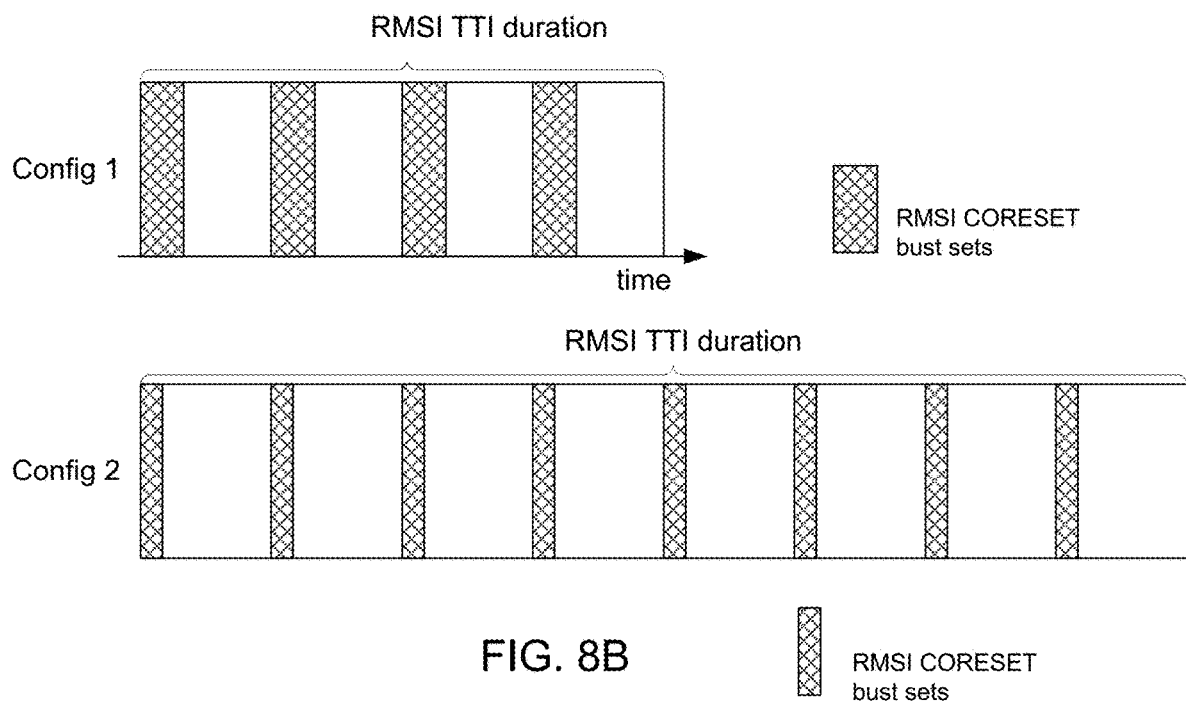

FIGS. 8A and 8B illustrates exemplary methods of signaling of variable number of repetitions to fulfil a desired coverage according to embodiments of the present disclosure. The embodiments shown in FIGS. 8A and 8B are for illustration only. Other embodiments are used without departing from the scope of the present disclosure.

In the method 1 as illustrated in FIG. 8A, variable numbers of CORESET burst sets (e.g., 4 or 8 repetitions or burst sets) are mapped in a fixed RMSI TTI duration (e.g., 80 msec). The resulting RMSI duty cycles will be 10 and 20 msec, respectively for 8 and 4 repetitions.

In the method 2 as illustrated in FIG. 8B, RMSI TTI duration scales with the number of repetitions (e.g., 4 or 8 repetitions), while the RMSI duty cycle is kept the same (e.g., 20 msec). The resulting RMSI TTI durations will be 80 and 160 msec respectively for 4 and 8 repetitions.

Slot location (Timing information) can be determined as $n_s = o_{RMSI} + f(n_{ss}, i_{ss}, \Delta_{ss})$. $o_{RMSI} \in \{0, o_1, o_2, \ldots\}$, for example, where or could corresponds to the number of slots in a half frame according to the configured RMSI numerology. Note that here $o_{common}$ for CSS corresponds to $o_{RMSI}$. When $o_{RMSI} = 0$, the RMSI and SS blocks are mapped in FDM manner; or when FDM is signalled, UE shall assume $o_{RMSI} = 0$. Depending on how many CORESETs are mapped per slot, different function $f(n_{ss}, i_{ss}, \Delta_{ss})$ may be used. It is expected that either one or two CORESETs can be mapped per slot, considering the support of FDM and TDM of RMSI and SS blocks, and also the support of slot-based and non-slot based transmissions. The intention to introduce SSB specific $\Delta_{ss}$ is to allow possibility of assigning a same CORESET for differently indexed SSBs. For example, SSB 0 and 1 points to the same CORESET by utilizing the delta offset. This provides a mechanism to allow number of CORESETs in the CORESET burst set to be smaller than the number of SSBs in the SSB set.

OFDM symbol indices (Timing information): can be determined as a function of at least one of numerology, number of CORESETs per slot, $i_{ss}$, and $\Delta_{ss}$. The number of OFDM symbols can be jointly determined with the RMSI CORESET BW, to be able to configure 48 or 96 REGs. The starting OFDM symbol may be determined as a function of at least one of the RMSI numerology, the SSB numerology, number of CORESETs per slot, and $i_{ss}$. In particular FDM/TDM of RMSI PDSCH and SSB clearly affects the CORESET time domain mapping.

In some embodiments, the RMSI scheduling configuration is indicated according to TABLE 1.

Figure 9:
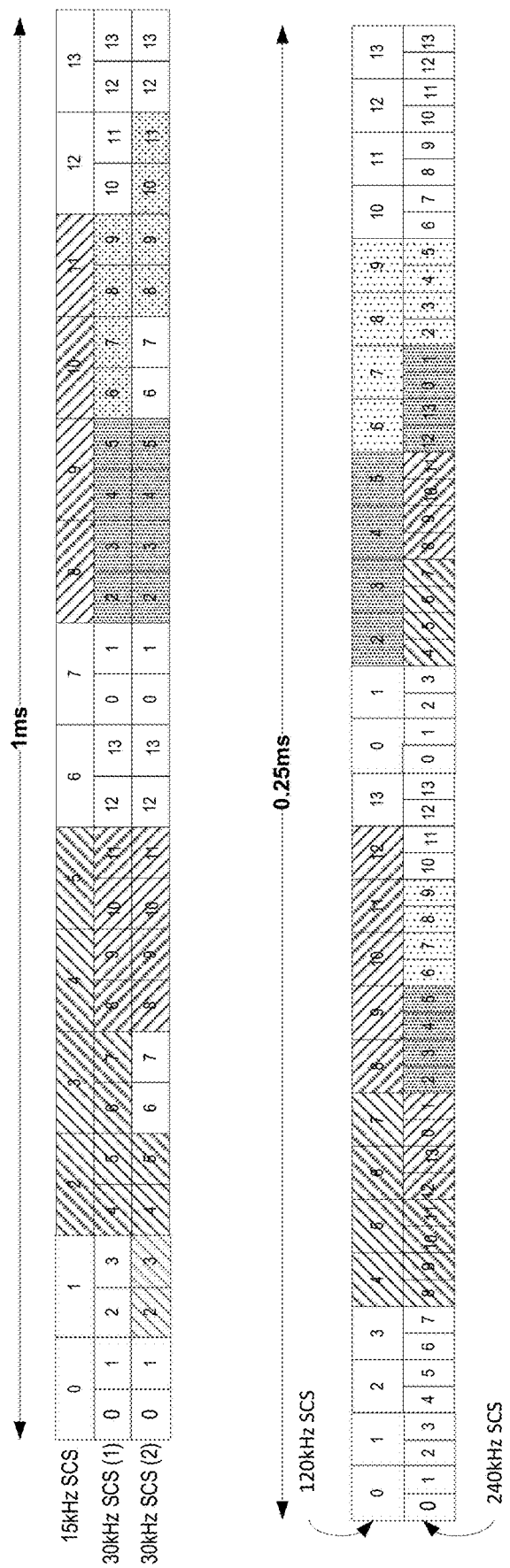
FIG. 9 illustrates an exemplary time domain mapping of the signature sequence blocks (SSBs) in a time unit according to one embodiment of the present disclosure.

FIG. 9 illustrates an exemplary time domain mapping of the SSBs in a time unit according to one embodiment of the present disclosure. The embodiment shown in FIG. 9 is for illustration only. Other embodiments are used without departing from the scope of the present disclosure.

Whether the system utilizes the Frequency Division Multiplex (FDM) or Time Division Multiplex (TDM) may be indicated by means of $o_{RMSI}$ being 0 (FDM) or the number of slots corresponding to non-zero value (TDM) in the RMSI numerology.

If FDM, the time-domain mapping of RMSI PDSCH is aligned with the SS blocks, and a distinct CORESET will be assigned to an SS block, where the CORESET is QCL'ed with the SS block in a set of large scale parameters, including the spatial parameters.

If TDM, the timing-domain mapping of RMSI PDSCH/CORESETs can be more flexibly designed. As illustrated in FIG. 3, the length of time unit is 1 msec, for 15 and 30 kHz SCS, and the length of time unit is 0.25 msec, for 120 and 240 kHz. The SSB location in time domain is dependent upon the subcarrier spacing value. The shaded areas correspond to the SSB locations. For example, for 15 kHz SCS, OFDM symbols $\{2, 3, 4, 5\}$ and $\{8, 9, 10, 11\}$ are used for SSB mapping in a 14-symbol slot.

Figure 10:
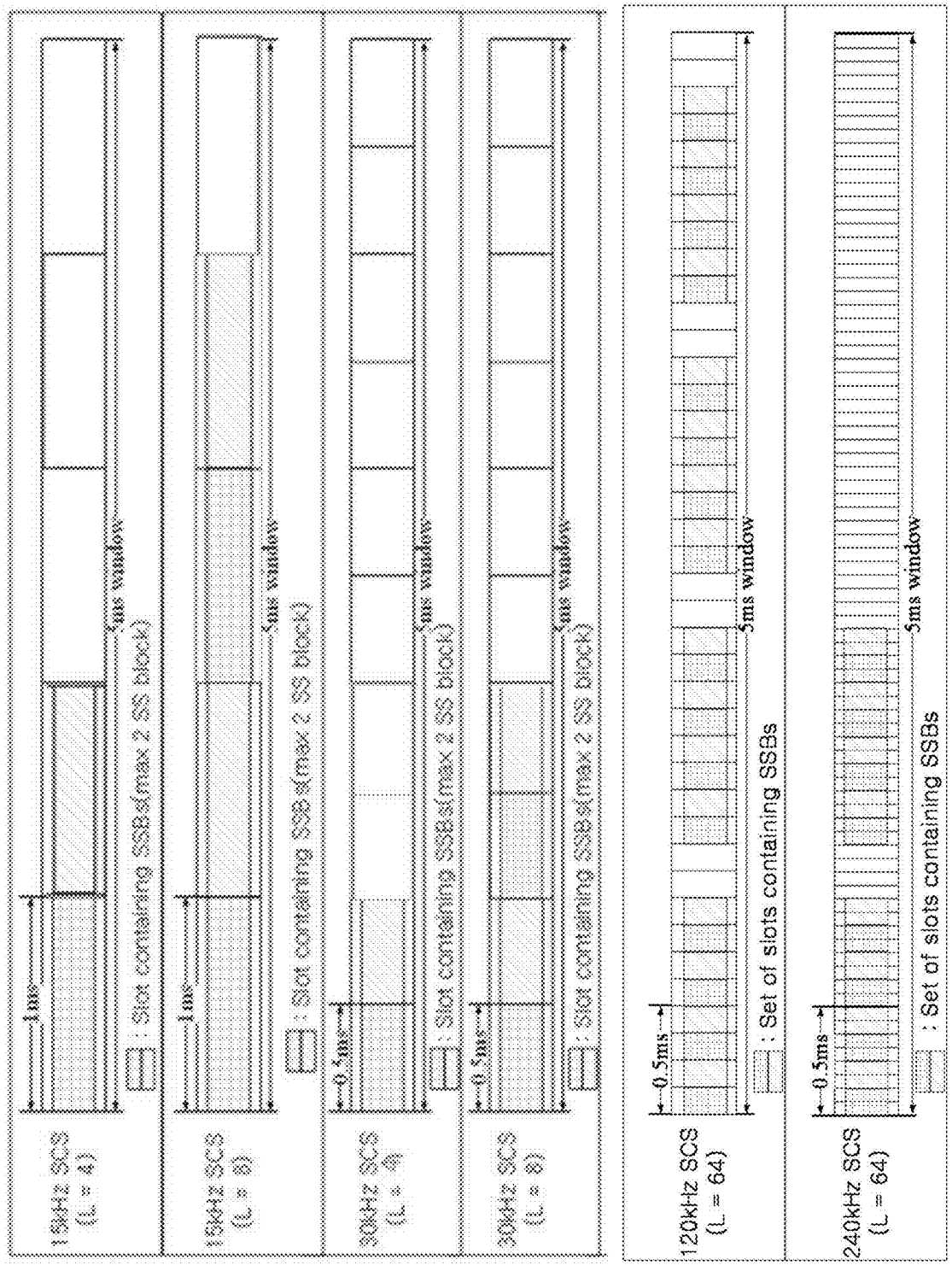
FIG. 10 illustrates another exemplary time domain mapping of the SSBs in a time unit according to one embodiment of the present disclosure.

FIG. 10 illustrates another exemplary time domain mapping of the SSBs in a time unit according to one embodiment of the present disclosure. The embodiment shown in FIG. 10 is for illustration only. Other embodiments are used without departing from the scope of the present disclosure.

Two or four time units are consecutively placed in time domain to map the full SSB set for a given carrier frequency and subcarrier spacing. The time unit mapping is illustrated in FIG. 4.

When the full SSBs are mapped (according to the value of L), up to 5 msec duration is occupied. Hence, a common offset value, $o_{RMSI}$, that can always be used for TDM mapping is the slot number corresponding to 5 msec. If mapping of both SSBs and RMSIs in a same half-frame is desired, the slot number corresponding to 2 or 3 msec in the RMSI numerology can also be considered to be signaled. This second number may be necessary for 5 msec SSB periodicity and TDM is desired by the network. Similarly, the slot number corresponding to 7 or 8 msec in the RMSI numerology can also be considered.

Candidate values for $o_{RMSI} = 0$, (the slot number corresponding to 5 msec in the RMSI numerology), (the slot number corresponding to 2 or 3 msec in the RMSI numerology), (the slot number corresponding to 7 or 8 msec in the RMSI numerology).

TABLE 1

| Information field | Number of bits | contents |
| --- | --- | --- |
| Numerology | 1 bit | Up to two values |
| BW for CORESET (equivalent to max BW for RMSI PDSCH) | 0 bit (fixed in the spec) | 25 PRBs (can be 24) |
| CORESET PRB offset | 2 bits | {0, +25, −25, [+50, −50 or N/A]} |
| RMSI CORESET monitoring timing | X (=3-4) bits | RMSI PDCCH/PDSCH periodicity, number of repetitions within RMSI TTI, slot location, number of CORESETs per slot, OFDM symbol indices |

In case of FDM mapping, one out of two candidate $o_{RMSI}$ values may be configured, one value is the value corresponding to $o_1=2$ or 3 msec, and the other value is $o_2=5$ msec. The candidate values for $o_{RMSI}$ may be specified in a numerology specific manner. One example is shown in Table 2.

TABLE 2

| $\mu$ | RMSI SCS $\Delta f = 2^\mu \cdot 15[kHz]$ | Candidate value 0 | Candidate Value 1: The slot number corresponding to 2 or 3 msec | Candidate Value 2: The slot number corresponding to 5 msec | Candidate Value 3: The slot number corresponding to 7 msec |
|---|---|---|---|---|---|
| 0 | 15 | 0 | 2 or 3 | 5 | 7 or 8 |
| 1 | 30 | 0 | 4 or 6 | 10 | 14 or 16 |
| 2 | 60 | 0 | 8 or 12 | 20 | 28 or 32 |
| 3 | 120 | 0 | 16 or 24 | 40 | 56 or 64 |

An alternative table specifying the candidate values for $o_{RMSI}$ is shown in Table 3.

TABLE 3

| $\mu$ | RMSI SCS $\Delta f = 2^\mu \cdot 15[kHz]$ | Candidate value 0 | Candidate Value 1: | Candidate Value 2: | Candidate Value 3: |
|---|---|---|---|---|---|
| 0 | 15 | 0 | 2 (2 msec) | 5 (5 msec) | 7 (7 msec) |
| 1 | 30 | 0 | 4 (2 msec) | 10 (5 msec) | 14 (7 msec) |
| 2 | 60 | 0 | 10 (2.5 msec) | 20 (5 msec) | 30 (7.5 msec) |
| 3 | 120 | 0 | 20 (2.5 msec) | 40 (5 msec) | 60 (7.5 msec) |

In some embodiments, at least one of (the number of CORESETs per slot), (slot number for the RMSI CORESET), $o_{RMSI}$, and (OFDM symbol indices in the slot) are indicated jointly by a bit field conveyed in the PBCH as part of RMSI scheduling information. In some embodiments, the bit field is referred to as pdcch-ConfigSIB1. One example construction is shown in TABLE 4.

TABLE 4

| Index | # CORESETS per slot | Slot number for the RMSI CORESET (here all the variables are in slots in the RMSI numerology) | $o_{RMSI}$ in msec (need to be converted into # of slots dependent upon the SSB numerology) | CORESET OFDM symbol indices (the first symbol number corresponds to the starting OFDM symbol of the CORESET) |
|---|---|---|---|---|
| 0 | 1 | $n_S = o_{RMSI} + i_{ss}$ | 5 | {0, 1} |
| 1 | 1 | $n_S = o_{RMSI} + i_{ss}$ | 5 | {0, 1, 2} |
| 2 | 2 | $n_S = n_{ss} + o_{RMSI}$ ... this works only when the RMSI numerology is the same as SSB numerology | 0 (this is for FDM) | {0, 1} if SSB index even; {6, 7} if SSB index odd |
| 3 | 2 | $n_S = o_{RMSI} + \text{floor}(i_{ss}/2)$ | 5 | {0, 1} if SSB index even; {2, 3} or {6, 7} if SSB index odd |

From FIG. 9, it can be seen that the possible locations of the OFDM symbols for the CORESET mapping corresponding to an SSB is dependent upon the numerology. If FDM is used (e.g., by means of indicating $o_{RMSI}=0$) for the RMSI and SS blocks, and the same numerology is used for the SSB and RMSI, the OFDM symbol numbers are determined as in TABLE 5.

TABLE 5

| SSB SCS and time unit length | Number of SSBs in a time unit | OFDM symbol numbers and slot index to map the CORESET corresponding to the SSB $i_{ss}$ (the first symbol number corresponds to the starting OFDM symbol of the CORESET) |
|---|---|---|
| 15 kHz and 1 msec | 2 | If $i_{ss} = 2k$, OFDM symbols {0, 1} in slot $n_{ss}(i_{ss})$<br>If $i_{ss} = 2k + 1$, OFDM symbols {6, 7} in slot $n_{ss}(i_{ss})$ |
| 30 kHz and 1 msec | 4 | If $i_{ss} = 4k$, OFDM symbols {0, 1} in slot $n_{ss}(i_{ss})$<br>If $i_{ss} = 4k + 1$, OFDM symbols {2, 3} in slot $n_{ss}(i_{ss})$<br>If $i_{ss} = 4k + 2$, OFDM symbols {12, 13} in slot $(n_{ss}(i_{ss}) - 1)$<br>If $i_{ss} = 4k + 1$, OFDM symbols {0, 1} in slot $n_{ss}(i_{ss})$ |
| 120 kHz and 0.25 msec | 4 | If $i_{ss} = 4k$, OFDM symbols {0, 1} in slot $n_{ss}(i_{ss})$<br>If $i_{ss} = 4k + 1$, OFDM symbols {2, 3} in slot $n_{ss}(i_{ss})$<br>If $i_{ss} = 4k + 2$, OFDM symbols {12, 13} in slot $(n_{ss}(i_{ss}) - 1)$<br>If $i_{ss} = 4k + 1$, OFDM symbols {0, 1} in slot $n_{ss}(i_{ss})$ |

If TDM is used, indication of slot and OFDM symbol locations for the CORESET burst set can be designed in a more flexible manner. However, fully flexible solution cannot be supported in NR, because of the constraints we have in the PBCH payload. In case full-slot scheduling is used, the number of CORESETs in a slot should be fixed to be one. The number of slots necessary to support the L CORESETs corresponding to L SSBs will be L slots in this case. Alternatively, when the non-slot based scheduling is used, e.g., with allocating two CORESETs per slot, the number of slots necessary to support the L CORESETs will be L/2 slots. This method could reduce the common search space CORESET overhead. In order to further reduce the common search space CORESET overhead, non-one-to-one correspondence of SSB and CORESET mapping should be supported. One way to achieve this is to indicate the SSB specific resource offset information $\Delta_{ss}(i_{ss})$ in the PBCH of each SSB. In one example, when $\Delta_{ss}(i_{ss})=0$, the CORESET time locations are selected according to the one-to-one mapping rule between the SSBs and CORESETs. When $\Delta_{ss}(i_{ss})=0$, the CORESET time locations for the even numbered $i_{ss}$ are selected according to the one-to-one mapping rule, while the CORESET time locations for the odd numbered $i_{ss}$ will be selected to be the time locations corresponding to $i_{ss}-1$, according to the one-to-one mapping rule. This way, the same CORESET resource is indicated by two different SSBs in consecutive SSB indices.

One example of one-to-one correspondence of SSB and CORESET timing in case of mapping a single CORESET per slot is described as in the following Slot number (in RMSI numerology) can be determined as $n_s=o_{RMSI}+i_{ss}$; in this case, $f(n_{ss}, i_{ss}, \Delta_{ss})=i_{ss}$. OFDM symbol numbers are fixed to be {0, 1}.

One example of one-to-one correspondence of SSB and CORESET timing in case of mapping two (2 CORESETs per slot to be used for TDM case (i.e., $o_{RMSI}$ is non-zero) is described as in the following. Slot number (in RMSI numerology) can be determined as $n_s=o_{RMSI}+\text{floor}(i_{ss}/2)$; in this case, $f(n_{ss}, i_{ss}, \Delta_{ss})=\text{floor}(i_{ss}/2)$. Similarly, if N CORESETs per slot, $n_s=o_{RMSI}+\text{floor}(i_{ss}/N)$, where N is an integer; OFDM symbol numbers are determined to be {0, 1} fixed if $i_{ss}$ is even; or {2, 3} fixed or alternatively {7, 8} fixed if $i_{ss}$ is odd.

FIG. 11 shows the slots mapped with the CORESET burst set when RMSI SCS is 15 or 30 kHz according to embodiments of the present disclosure. The embodiments shown in FIG. 11 is for illustration only. Other embodiments are used without departing from the scope of the present disclosure.

In FIG. 11, the shaded slots are the ones mapped with the CORESET. The association of SSB index $i_{ss}$ to the slots are according to the ascending order. For example, according to the mapping corresponding to 15 kHz Alt 1 with one CORESET per slot, the CORESET corresponding to SSB4 is mapped to slot #4. According to the mapping corresponding to 15 kHz Alt 2 with one CORESET per slot, the CORESET corresponding to SSB4 is mapped to slot #5. According to the mapping corresponding to 15 kHz Alt 1 with two CORESETs per slot, the CORESET corresponding to SSB4 is mapped to slot #2.

FIG. 12 shows the slots mapped with the CORESET burst set when RMSI SCS is 60 or 120 kHz according to embodiments of the present disclosure. The embodiments shown in FIG. 12 is for illustration only. Other embodiments are used without departing from the scope of the present disclosure.

The shaded slots are the ones mapped with the CORESET. The same pattern may repeat up to X times, according to the number of CORESETs required for the SSB mapping.

The number of CORESETs per slot may be implicitly indicated by the ratio of the RMSI SCS to the SSB SCS if $o_{common}=0$ (or the FDM is indicated). In case of FDM, the number of PDSCH symbols scheduled by the PDCCH may also be pre-configured in the spec, based on the ratio of RMSI SCS to SSB SCS.

Otherwise (i.e., $o_{common}>0$ or if TDM is indicated), the number of CORESETs is separately indicated; and the number of PDSCH symbols scheduled by the PDCCH may be dynamically signaled in the DCI, or separately indicated in the PBCH.

Figure 13A:
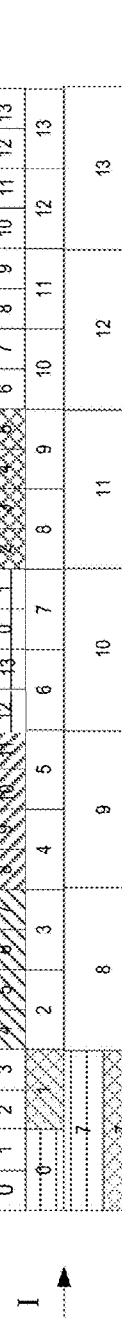
Figure 13C:
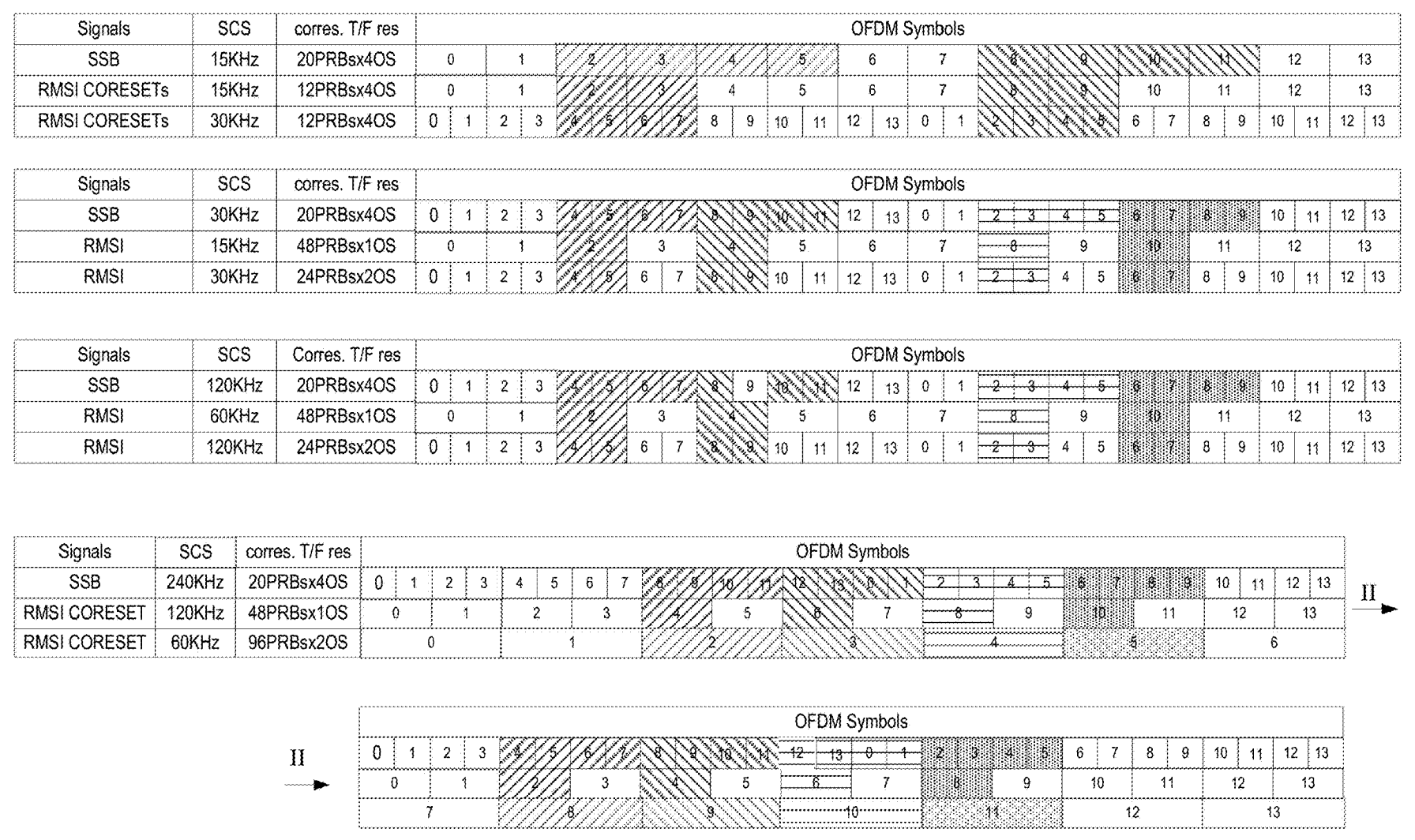

FIGS. 13A, 13B, 13C and 13D illustrate CORESET mappings for FDM'ed CORESET PDSCH with SSBs, according to some embodiments of the present disclosure. In particular, FIG. 13A illustrates an FDM case of the CORESET mapping option 1-48/96 total PRBs, FIG. 13B illustrates an FDM case of the CORESET mapping option 1-24 total PRBs, FIG. 13C illustrates an FDM case of the CORE- SET mapping option 2-48/96 total PRBs, and FIG. 13D illustrates a FDM case of the CORESET mapping option 2-24 total PRBs. The embodiments shown in FIGS. 13A, 13B, 13C and 13D are for illustration only. Other embodiments are used without departing from the scope of the present disclosure.

A CORESET for the PDSCH which is FDM'ed with an SSB, should be located either prior to or before the set of OFDM symbols with SSB.

In option 1, the OFDM symbols prior to the OFDM symbols with the SSB are configured for the CORESET, as illustrated in FIGS. 7A and 7B. This option is applicable regardless of whether the system is coverage-limited or not, and whether same/different numerologies are used for the RMSI and SSB. The CORESET mapping in FIG. 7A allows for at least 48 total PRBs in RMSI numerology. The mapping in FIG. 7B allows for 24 total PRBs in RMSI numerology, and hence it can be less prioritized. In case where 240 kHz SCS is applied to SSB, the option 1 mapping is challenging, as only two OFDM symbols are available prior to 4 consecutive SSBs. One possibility is to map two CORESETs in each of these two OFDM symbol as illustrated in the figure.

In option 2, the OFDM symbols on a subset of OFDM symbols with the SSB are configured for the CORESET, as illustrated in FIGS. 7C and 7D. This option may be applicable if the network is willing to operate in a smaller coverage in exchange of potentially smaller overhead, and if the network can have a wide initial active BW (although it will be limited by the UE capability). To efficiently support the Option 2, it may be required that the UE assumes that the rest of the REs other than those used for the PDCCH mapping are available for PDSCH transmissions. In other words, when FDM'ed initial active BWP is configured, for receiving the RMSI PDSCH scheduled by the PDCCH, the UE shall rate match around only the time/frequency resources (e.g., PRBs) corresponding to the PDCCH REs conveying the RMSI PDSCH scheduling information; and assumes that all the other REs (if scheduled) are available for PDSCH data reception. FIG. 13D FDM case:

An example mapping of the number of CORESETs per slot and the number of PDSCH symbols to the RMSI SCS and the SSB SCS when FDM is indicated is illustrated in the TABLE 6A, for which Option 1 is assumed.

TABLE 6A

| SSB SCS | RMSI SCS | Ratio of the RMSI SCS to the SSB SCS | Number of CORESETs per slot | Number of OFDM symbols in a PDSCH | Number of OFDM symbol numbers for the OFDM CORESETs (the first symbol number corresponds to the starting OFDM symbol of the CORESET) |
|---|---|---|---|---|---|
| 15 kHz | 15 kHz | 1 | 2 | 4 | $\{0, 1\}, \{6, 7\}$ for $i_{ss} = 2k, 2k + 1$ |
| 15 kHz | 30 kHz | 2 | 1 | 8 | $\{0, 1\}$ or $\{2, 3\}$ for $i_{ss} = 2k, 2k + 1$ Alternatively, for $i_{ss} = 2k: \{0, 1, 2, 3\}$ in slot $n_{ss}(i_{ss})$; for $i_{ss} = 2k + 1: \{12, 13\}$ in slot $n_{ss}(i_{ss}) - 1$ and $\{0, 1\}$ in $n_{ss}(i_{ss})$ |
| 15 kHz | 60 kHz | 4 | 1 | 12 | $\{0, 1\}$ |
| 30 kHz | 15 kHz | ½ | 4 | 2 | $\{0\}, \{1\}, \{6\}, \{7\}$ for $i_{ss} = 4k, 4k + 1, 4k + 2, 4k + 3$ |
| 30 kHz | 30 kHz | 1 | 3 for even numbered slots 1 for odd numbered slots | 4 | If $i_{ss} = 4k$, OFDM symbols $\{0, 1\}$ in slot $n_{ss}(i_{ss})$ If $i_{ss} = 4k + 1$, OFDM symbols $\{2, 3\}$ in slot $n_{ss}(i_{ss})$ If $i_{ss} = 4k + 2$, OFDM symbols $\{12, 13\}$ in slot $(n_{ss}(i_{ss}) - 1)$ If $i_{ss} = 4k + 3$, OFDM symbols $\{0, 1\}$ in slot $n_{ss}(i_{ss})$ |
| 120 kHz | 60 kHz | ½ | 4 | 2 | $\{0\}, \{1\}, \{6\}, \{7\}$ for $i_{ss} = 4k, 4k + 1, 4k + 2, 4k + 3$ |
| 120 kHz | 120 kHz | 1 | 2 | 4 | If $i_{ss} = 4k$, OFDM symbols $\{0, 1\}$ in slot $n_{ss}(i_{ss})$ If $i_{ss} = 4k + 1$, OFDM symbols $\{2, 3\}$ in slot $n_{ss}(i_{ss})$ If $i_{ss} = 4k + 2$, OFDM symbols $\{12, 13\}$ in slot $(n_{ss}(i_{ss}) - 1)$ If $i_{ss} = 4k + 3$, OFDM symbols $\{0, 1\}$ in slot $n_{ss}(i_{ss})$ |
| 240 kHz | 120 kHz | ½ | 4 | 2 | $\{0\}, \{1\}, \{6\}, \{7\}$ for $i_{ss} = 4k, 4k + 1, 4k + 2, 4k + 3$ Alternatively: $\{0\}, \{1\}$ in slot $n_{ss}(i_{ss})$ for $i_{ss} = 8k, 8k + 1$; $\{2\}$ in slot $n_{ss}(i_{ss})$ for $i_{ss} = 8k + 2$; $\{3\}$ in slot $n_{ss}(i_{ss}) - 1$ for $i_{ss} = 8k + 3$; $\{12\}, \{13\}$ in slot $n_{ss}(i_{ss}) - 1$ for $i_{ss} = 8k + 4, 8k + 5$ $\{0\}, \{1\}$ in slot $n_{ss}(i_{ss}) - 1$ for $i_{ss} = 8k + 6, 8k + 7$; |
| 240 kHz | 60 kHz | ¼ | 4 | 1 | $\{0\}$ in slot $n_{ss}(i_{ss})$ for $i_{ss} = 8k, 8k + 1$; $\{1\}$ in slot $n_{ss}(i_{ss})$ for $i_{ss} = 8k + 2$ $\{1\}$ in slot $n_{ss}(i_{ss}) - 1$ for $i_{ss} = 8k + 3$ $\{6\}$ in slot $n_{ss}(i_{ss}) - 1$ for $i_{ss} = 8k + 4, 8k + 5$ $\{7\}$ in slot $n_{ss}(i_{ss}) - 1$ for $i_{ss} = 8k + 6, 8k + 7$ |

An example mapping of the number of CORESETs per slot and the number of PDSCH symbols to the RMSI SCS and the SSB SCS when FDM is indicated is illustrated in the TABLE 6B, for which Option 2 is assumed.

TABLE 6B

| SSB SCS | RMSI SCS | Ratio of the RMSI SCS to the SSB SCS | Number of CORESETs per slot | Number of OFDM symbols in a PDSCH | OFDM symbol numbers for the CORESETs (the first symbol number corresponds to the starting OFDM symbol of the CORESET) |
|---|---|---|---|---|---|
| 15 kHz | 15 kHz | 1 | 2 | 4 | {2}, {8} for $i_{ss}$ = 2k, 2k + 1 Alternatively: {2, 3}, {8, 9} for $i_{ss}$ = 2k, 2k + 1 |
| 15 kHz | 30 kHz | 2 | 1 | 8 | {4, 5}, {2, 3} for $i_{ss}$ = 2k, 2k + 1 Alternatively: {4, 5, 6, 7}, {2, 3, 4, 5} for $i_{ss}$ = 2k, 2k + 1 |
| 30 kHz | 15 kHz | ½ | 4 | 2 | {2}, {4}, {8}, {10} for $i_{ss}$ = 4k, 4k + 1, 4k + 2, 4k + 3 |
| 30 kHz | 30 kHz | 1 | 2 | 4 | {4}, {8}, {2}, {6} for $i_{ss}$ = 4k, 4k + 1, 4k + 2, 4k + 3 Alternatively: {4, 5}, {8, 9}, {2, 3}, {6, 7} for $i_{ss}$ = 4k, 4k + 1, 4k + 2, 4k + 3 |
| 120 kHz | 60 kHz | ½ | 4 | 2 | {2}, {4}, {8}, {10} for $i_{ss}$ = 4k, 4k + 1, 4k + 2, 4k + 3 |
| 120 kHz | 120 kHz | 1 | 2 | 4 | {4}, {8}, {2}, {6} for $i_{ss}$ = 4k, 4k + 1, 4k + 2, 4k + 3 Alternatively: {4, 5}, {8, 9}, {2, 3}, {6, 7} for $i_{ss}$ = 4k. 4k + 1, 4k + 2, 4k + 3 |
| 240 kHz | 120 kHz | ½ | 4 | 2 | {4}, {6}, {8}, {10} for $i_{ss}$ = 8k, 8k + 1, 8k + 2, 8k + 3 {2}, {4}, {6}, {8} for $i_{ss}$ = 8k + 4, 8k + 5, 8k + 6, 8k + 7 |
| 240 kHz | 60 kHz | ¼ | 4 | 1 | {2}, {3}, {4}, {5} for $i_{ss}$ = 8k, 8k + 1, 8k + 2, 8k + 3 {8}, {9}, {10}, {11} for $i_{ss}$ = 8k + 4, 8k + 5, 8k + 6, 8k + 7 |

An example mapping of the number of CORESETs per slot to the number of PDSCH symbols when TDM is indicated is illustrated in the TABLE 6.

TABLE 6

| Number of CORESETs per slot | Number of OFDM symbols in a PDSCH | OFDM symbol numbers for the CORESETs (the first symbol number corresponds to the starting OFDM symbol of the CORESET) |
|---|---|---|
| 1 | 12 | {0, 1} |
| 2 | 5, corresponds to Alt 1: {{2, 3, 4, 5, 6}, {9, 10, 11, 12, 13}} Alt 2: {{4, 5, 6, 7, 8}, {9, 10, 11, 12, 13}} for $i_{ss}$ = 2k, 2k + 1 Alternatively: 7, corresponds to {{0-6} and {7-13}} with Alt 2 for the CORESET OFDM symbols | Alt 1: {{0, 1}, {2, 3}} Alt 2: {{0, 1}, {7, 8}} for $i_{ss}$ = 2k, 2k + 1 |

In some embodiments, the number of RMSI repetitions are determined as a function of the number of OFDM symbols for the PDSCH. It is noted that the number of OFDM symbols for the PDSCH may be determined according to the embodiments related to TABLE 5 or TABLE 6. One such example is illustrated in TABLE 7.

TABLE 7

| # OFDM symbols in a PDSCH | # REs per slot in the UE minimum BW (of 300 SCs) | # of PDSCHs (repetitions) per RMSI TTI for ~300 bit RMSI | # of PDSCHs (repetitions) per RMSI TTI for ~400 bit RMSI |
|---|---|---|---|
| 2 | 600 | 16(~19.2) | 24(~25.6) |
| 4 | 1200 | 8(~9.6) | 12(~12.8) |
| 7 | 2100 | 4(~5.5) | 8(~7.3) |
| 12 | 3600 | 4(~3.2) | 4(~4.3) |
| 5 | 1500 | 8(~7.7) | 8(~10.2) |

Overall signaling tables, Tables 8A-8C, constructed according to some embodiments of the present disclosure can be found as follows: Indication 1: # of OFDM symbols & RMSI CORESET BW—1 bit; Indication 2: Frequency offset of CORESET—7 bits (including floating sync), or 3 bits (excluding floating sync); or Indication 3: RMSI CORESET slot offset $o_{RMSI}$—1 bit. Indication 4: # of CORESETs per slot, starting OFDM symbol number, RMSI CORESET window periodicity—1 bit. Indication 5: CORESET-specific slot offset $f(n_{ss}, i_{ss})$ from $o_{RMSI}$—1 bit (TDM only).

TABLE 8A

| TDM vs. FDM | State of indication #3 | $o_{RMSI}$ (Either 1 separate bit or jointly coded with frequency offset) |
|---|---|---|
| FDM | 0 | 0 |
| | 1 | Reserved |
| TDM | 0 | $o_1$ |
| | 1 | $o_2$ |

TABLE 8B

| TDM vs. FDM | State of indication #4 | # of CORESETs per slot | Starting OFDM symbol number | RMSI CORESET window periodicity |
|---|---|---|---|---|
| TDM | 0 | 1 | 0 | A first periodicity (e.g., (RMSI TTI)/4 msec) |
| | 1 | 2 | 0 if $i_{SSB}$ is 2k<br>7 if $i_{SSB}$ is 2k + 1 | A second periodicity (e.g., (RMSI TTI)/8 msec) |
| FDM | 0 | Hard coded in the spec | Hard coded in the spec | A third periodicity (e.g., (RMSI TTI)/8 msec) |
| | 1 | Hard coded in the spec | Hard coded in the spec | A fourth periodicity (e.g., (RMSI TTI)/16 msec) |

Figure 14:
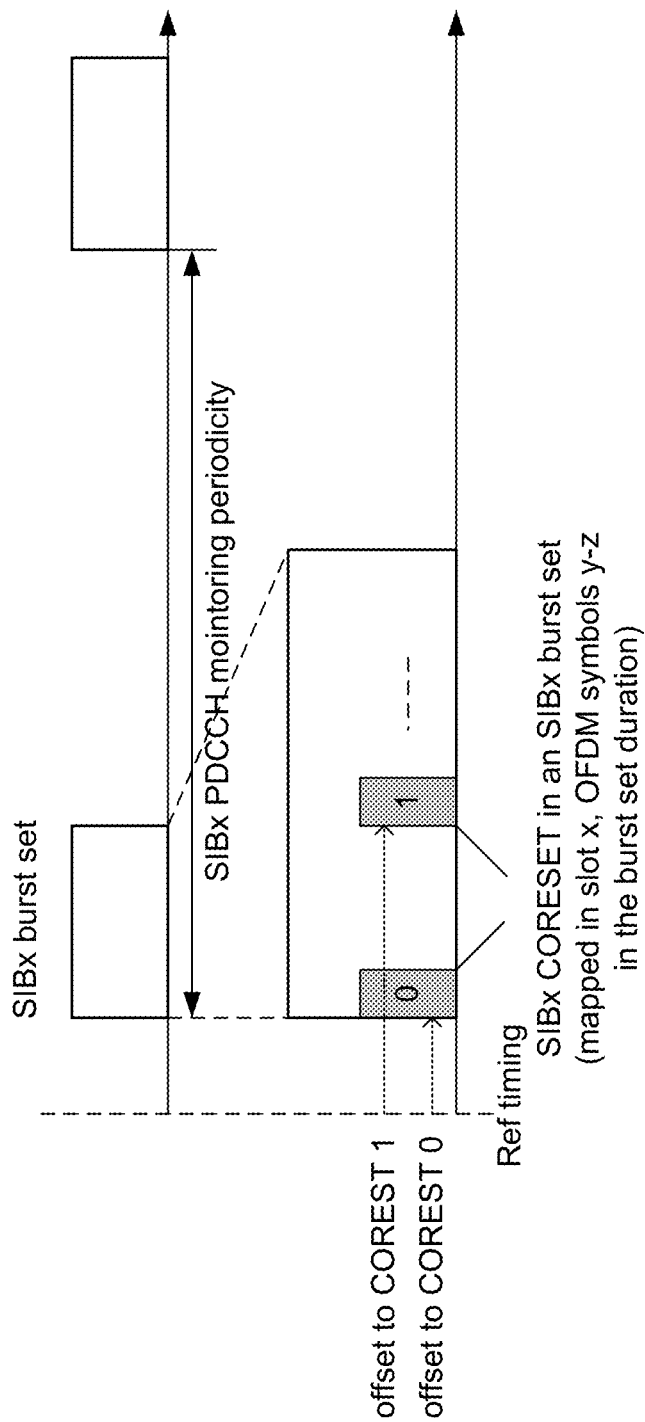
FIG. 14 illustrates an exemplary system information block x (SIBx) CORESET transmission timing according to one embodiment of the present disclosure.

FIG. 14 illustrates an exemplary SIBx CORESET transmission timing according to one embodiment of the present disclosure. The embodiment shown in FIG. 14 is for illustration only. Other embodiments are used without departing from the scope of the present disclosure.

The CORESETs that are QCL'ed with different SSBs are TDM'ed. The UE who detects SSB i should be able to find the timing for CORESET i, which is QCL'ed with the SSB. UE can find the timing with jointly considering SSB index i and the commonly signalled PBCH contents.

An example construction of indication #5 is shown in TABLE 8C.

TABLE 8C

| TDM vs. FDM | # of CORESETs per slot | State of indication #5 | Slot offset $f(n_{ss}, i_{ss})$ from $o_{RMSI}$ | SSB to RMSI CORESET mapping |
|---|---|---|---|---|
| TDM | 1 | 0 | $i_{ss}$ | One-to-one mapping |
| | | 1 | floor($i_{ss}$/2) | Two-to-one mapping |
| | 2 | 0 | floor($i_{ss}$/2) | One-to-one mapping |
| | | 1 | floor($i_{ss}$/4) | Two-to-one mapping |

Figure 15A:
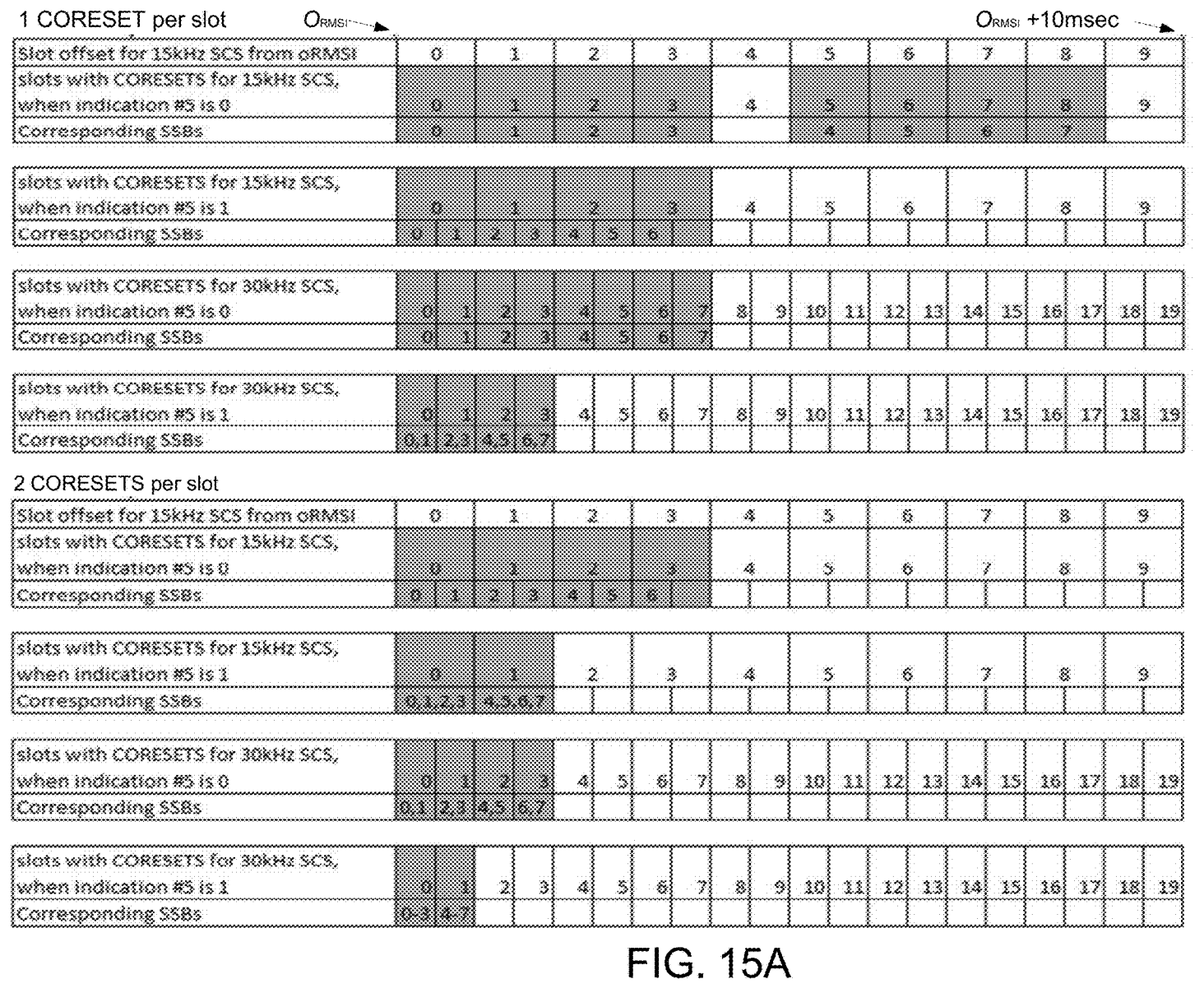

FIGS. 15A, 15BA and 15BB illustrate alternative SIBx CORESET transmission timings according to embodiments of the present disclosure. The embodiments shown in FIGS. 15A, 15BA and 15BB are for illustration only. Other embodiments are used without departing from the scope of the present disclosure.

Given the very limited payload available in the PBCH to configure RMSI CORESETs and RMSI timing, some parameters need to be fixed in the specification, i.e., only essential information that are necessary to be informed for the UE to receive RMSI PDCCH/PDSCH needs to be included.

In order to deal with FDM and TDM mapping of RMSI and SSBs, it is necessary to make frequency domain mapping information (i.e., PRBs and frequency position) configurable. In addition, to cope with both mini-slot and non-mini slot mapping, and also to provide sufficient PDCCH coverage, it is also necessary to make the set of OFDM symbol indices for a CORESET configurable. In consideration of the multi-beam RMSI and mini-slot mapping, the CORESET OFDM symbols should be determined by using the common PBCH contents and SSB index jointly.

The RMSI timing configuration needs to be known at the UE when trying to decode RMSI. The timing configuration can be either fixed in the spec, or at least partially configured by the network, for network resource utilization flexibility/efficiency. As both mini-slots and full slots are agreed to be used for RMSI transmissions, hard-coded timing can be ruled out. The multi-beam RMSI mapping in time domain should take at least the mini-slot or full-slot mapping of RMSI; and the beam-specific RMSI timing needs to be conveyed via the SSB index. The OSI timing configuration should be done similar to RMSI timing configuration, i.e., some information conveyed via PBCH and SSB index should be jointly used.

Then, the rest of information does not seem to be essential to be made configurable, although this may imply that some system-operation flexibility might be lost. It is already challenging to indicate only those above information in the PBCH, given the maximum payload of [8] bits excluding the numerology indication.

Figure 16:
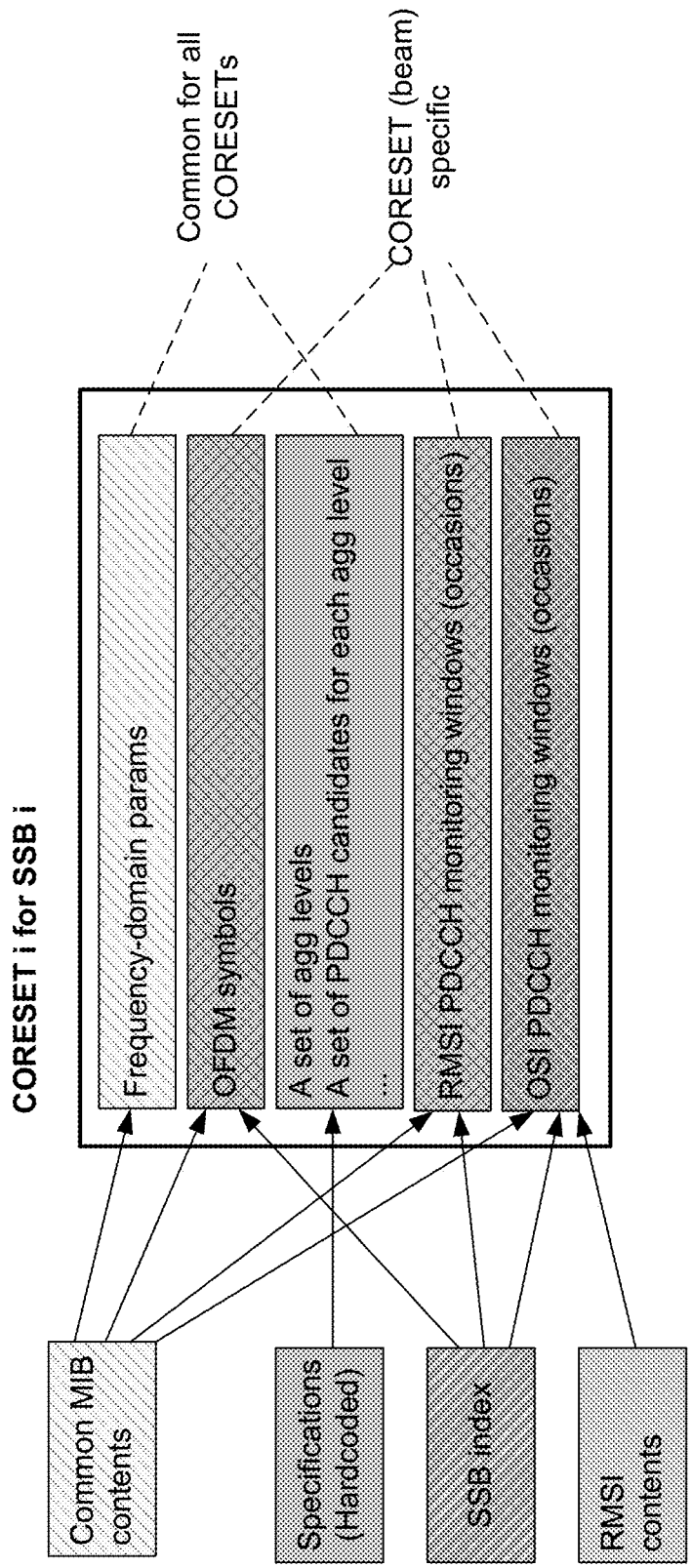
FIG. 16 is an exemplary diagram illustrating how RMSI CORESET parameters are configured according to one embodiment of the present disclosure.

FIG. 16 is an exemplary diagram illustrating how RMSI CORESET parameters are configured according to one embodiment of the present disclosure. The embodiment shown in FIG. 16 is for illustration only. Other embodiments are used without departing from the scope of the present disclosure.

Frequency domain parameters are indicated via the common MIB contents.

The OFDM symbols and RMSI PDCCH monitoring windows are CORESET specific, and determined by the SSB index conveyed in the SSB and the common PBCH contents.

OSI (SIBx, x>1) PDCCH monitoring windows are determined CORESET specifically, by the SSB index conveyed in the SSB, the common PBCH contents and the RMSI contents.

The PDCCH DMRS of the CORESET i (for which some of those parameters are determined according to SSB index i) can be assumed to be QCL'ed with SSB i.

Time domain parameters include a set of OFDM symbol indices in a slot corresponding to a CORESET, and RMSI timing configuration (i.e., PDCCH monitoring occasions for RMSI).

SSBs are QCL'ed with CORESETs rather than search spaces. A CORESET can potentially be used for multiple sets of search spaces, e.g., for common and UE specific sets of search spaces. According to the decision, the CORESET timing does not need to be separately indicated, and the CORESET timing is determined as a union of the timing instances for the configured search spaces for the CORESET. It would be sufficient if PBCH can provide RMSI monitoring timing.

Figure 17:
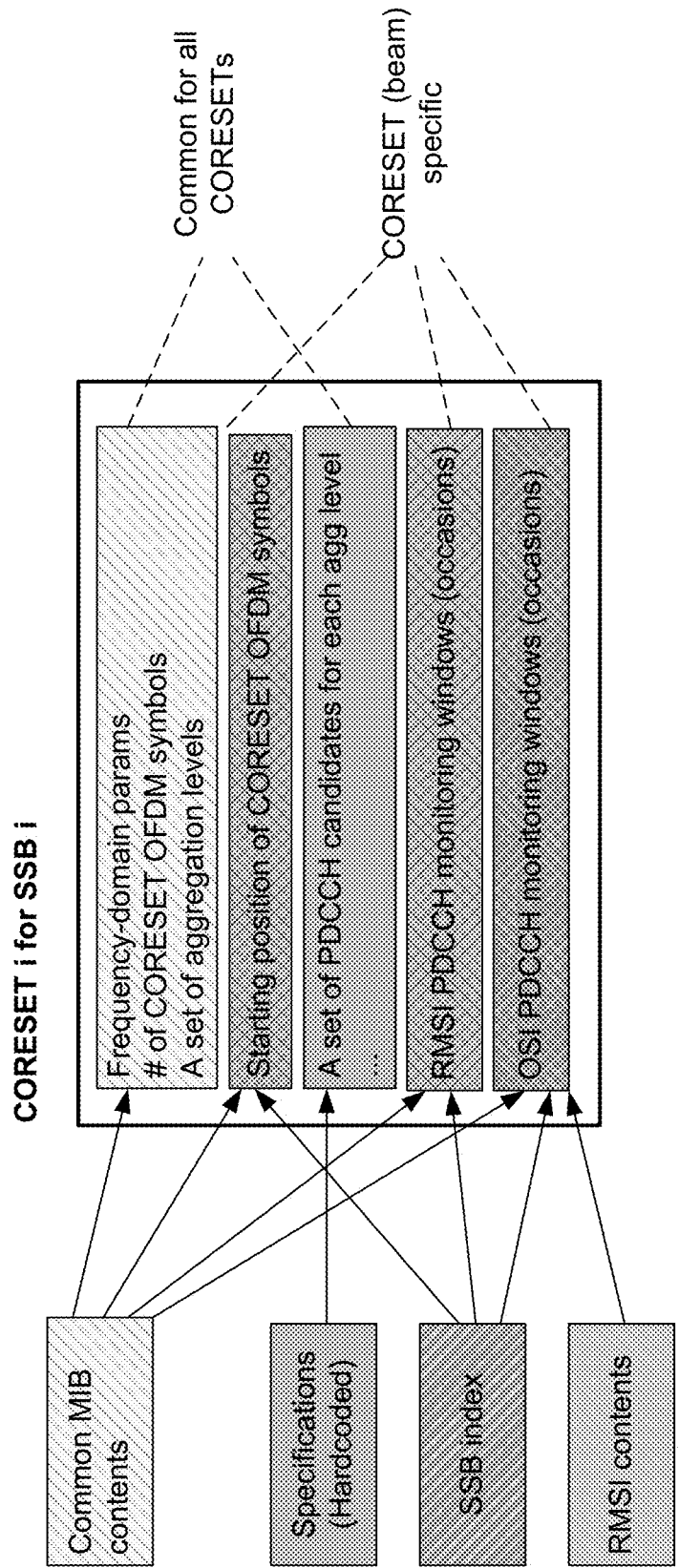
FIG. 17 is another exemplary diagram illustrating how RMSI CORESET parameters are configured according to one embodiment of the present disclosure.

FIG. 17 is another exemplary diagram illustrating how RMSI CORESET parameters are configured according to one embodiment of the present disclosure. The embodiment shown in FIG. 17 is for illustration only. Other embodiments are used without departing from the scope of the present disclosure.

Frequency domain parameters, the number of CORESET OFDM symbols and a set of aggregation levels are indicated via the common MIB contents.

In the set of aggregation levels, 4, 8, [16] CCE aggregation levels should be supported (for ensuring the PDCCH coverage), and/or 48 and 96 total number of REGs should be supported (depending on FDM vs. TDM and available operator BW), where the number is determined implicitly by the indication of CORESET BW and number of OFDM symbols.

A starting position of the CORESET OFDM symbols, and RMSI PDCCH monitoring windows are CORESET specific, and determined by the SSB index conveyed in the SSB and the common PBCH contents.

OSI (SIBx, x>1) PDCCH monitoring windows are determined CORESET specifically, by the SSB index conveyed in the SSB, the common PBCH contents and the RMSI contents.

The PDCCH DMRS of the CORESET i (for which some of those parameters are determined according to SSB index i) can be assumed to be QCL'ed with SSB i.

Figure 18:
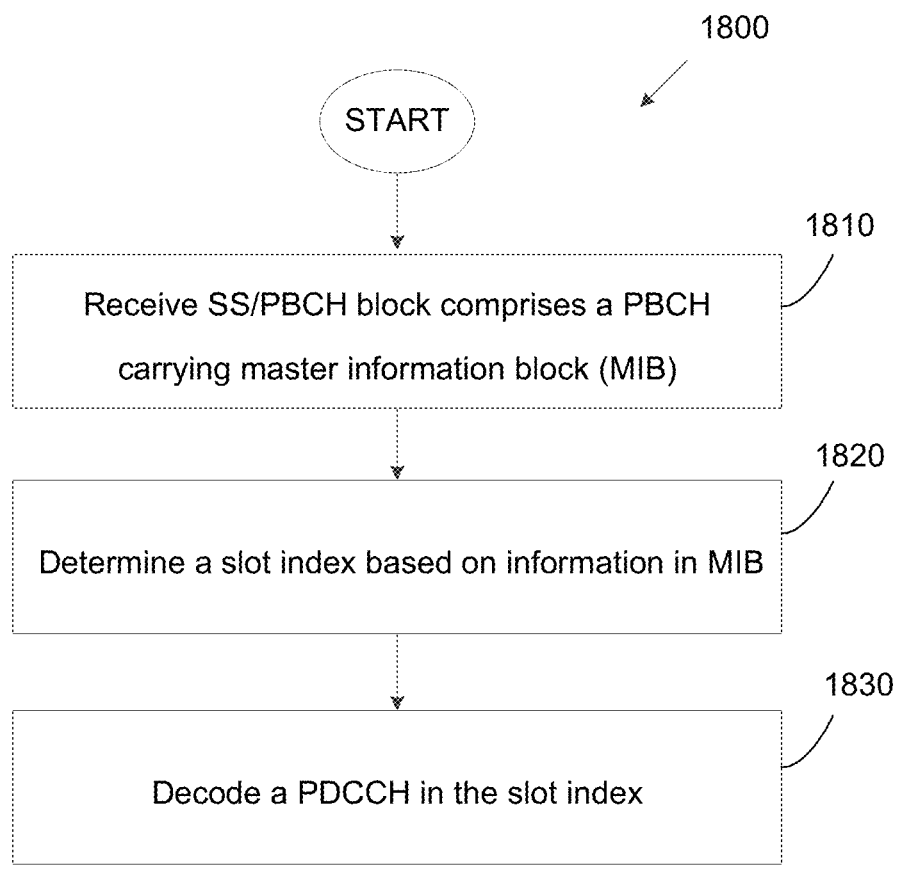
FIG. 18 illustrates an exemplary flow chart of a method for receiving control information in a wireless communication system according to embodiments of the present disclosure.

FIG. 18 illustrates an exemplary flow chart of a method 1800 for receiving control information in a wireless communication system, as may be performed by a UE, according to one embodiment of the present disclosure. The embodiment of the method 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. Other embodiments are used without departing from the scope of the present disclosure.

As shown in FIG. 18, the method 1800 begins at step 1810. In step 1810, the UE receives a synchronization signal/physical broadcasting channel (SS/PBCH) block of an index i from a base station (BS). The SS/PBCH block comprises a PBCH carrying master information block (MIB).

In step 1820, for the SS/PBCH block of the index i, the UE determines a slot index $n_0$, as a sum of an offset value and [i*M]. The offset value is determined based on a first value O and a second value $\mu$. The first value O can be determined according to an index indicated in the MIB, pdcch-ConfigSIB1, in which the index configures physical downlink control channel (PDCCH) monitoring occasions. The second value $\mu$ can be indicated in the MIB, wherein the second value $\mu$ represents a subcarrier spacing configuration. Here, M is a positive number determined according to the pdcch-ConfigSIB1.

Subsequently, the UE in step 1830 performs PDCCH monitoring and decodes a PDCCH in the slot index $n_0$.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A method for operating a user equipment (UE) in a wireless communication system, the method comprising:
   receiving, from a base station (BS), a synchronization signal/physical broadcasting channel (SS/PBCH) block;
   identifying at least one parameter for monitoring occasions for a physical downlink control channel (PDCCH) based on a multiplexing pattern, an index of the SS/PBCH block, and a subcarrier spacing for the PDCCH, wherein the multiplexing pattern is one of three multiplexing patterns, wherein the three multiplexing patterns include time division multiplexing (TDM), frequency division multiplexing (FDM) option 1 in which orthogonal frequency division multiplexing (OFDM) symbols of the PDCCH are prior to OFDM symbols of the SS/PBCH block, and FDM option 2 in which OFDM symbols of the PDCCH are a subset of OFDM symbols of the SS/PBCH block; and
   receiving, from the BS, the PDCCH on the monitoring occasions based on the at least one parameter.

2. The method of claim 1, wherein, when the multiplexing pattern is a first multiplexing pattern:
   the at least one parameter comprises a starting slot index for the PDCCH, and
   identifying the at least one parameter comprises identifying the starting slot index for the PDCCH based on the index of SS/PBCH block, an offset indicated by a master information block (MIB) comprised in the SS/PBCH block, and a value of numerology indicated by a subcarrier spacing for the PDCCH.

3. The method of claim 2, wherein:
   the offset is from a set of candidate offsets, and
   the set of candidate offsets comprises {0, 2, 5, 7} or {0, 2.5, 5, 7.5}.

4. The method of claim 1, wherein:
   when the multiplexing pattern is a first multiplexing pattern:
      the at least one parameter comprises a first symbol index for the PDCCH, and
      identifying the at least one parameter comprises identifying the first symbol index based on a number of search space sets per slot, and
   the number of search space sets per slot is 1 or 2.

5. The method of claim 1, wherein, when the multiplexing pattern is a second multiplexing pattern or a third multiplexing pattern:
   the at least one parameter comprises a slot index for the PDCCH, and
   identifying the at least one parameter comprises identifying the slot index for the PDCCH to be a same value as a slot index for the SS/PBCH block or a value of the slot index for the SS/PBCH block minus 1 based on a first subcarrier spacing for the SS/PBCH block, a second subcarrier spacing for the PDCCH, and the index of the SS/PBCH block.

6. The method of claim 1, wherein, when the multiplexing pattern is a second multiplexing pattern or a third multiplexing pattern:
   the at least one parameter comprises a first symbol index for the PDCCH, and
   identifying the at least one parameter comprises identifying the first symbol index for the PDCCH based on a first subcarrier spacing for the SS/PBCH block, a second subcarrier spacing for the PDCCH, and the index of the SS/PBCH block.

7. The method of claim 6, wherein, when the multiplexing pattern is the second multiplexing pattern, the first subcarrier spacing value is 120 kHz, and the second subcarrier spacing value is 60 kHz:
   the first symbol index is identified as 0, 1, 6, 7, when the index of the SS/PBCH block is equal to 4k, 4k+1, 4k+2, 4k+3, respectively, where k is an integer.

8. The method of claim 6, wherein, when the multiplexing pattern is the second multiplexing pattern, the first subcarrier spacing value is 240 kHz, and the second subcarrier spacing value is 120 kHz:
   the first symbol index is identified as 0, 1, 2, 3, 0, 1, when the index of the SS/PBCH block is equal to 8k, 8k+1, 8k+2, 8k+3, 8k+6, 8k+8, respectively, where k is an integer, and a slot index for the PDCCH is a same value as a slot index for the SS/PBCH block, and
   the first symbol index is identified as 12, 13, when the index of the SS/PBCH block is equal to 8k+4, 8k+5, respectively, where k is an integer, and the slot index for the PDCCH is a value of the slot index for the SS/PBCH block minus 1.

9. The method of claim 6, wherein, when the multiplexing pattern is the third multiplexing pattern, the first subcarrier spacing value is 120 kHz, and the second subcarrier spacing value is 120 kHz:
   the first symbol index is identified as 4, 8, 2, 6, when the index of the SS/PBCH block is equal to 4k, 4k+1, 4k+2, 4k+3, respectively, where k is an integer.

10. A user equipment (UE) in a wireless communication system, the UE comprising:
    a transceiver configured to receive, from a base station (BS), a synchronization signal/physical broadcasting channel (SS/PBCH) block; and
    a processor operably connected to the transceiver, the processor configured to identify at least one parameter for monitoring occasions for a physical downlink control channel (PDCCH) based on a multiplexing pattern, an index of the SS/PBCH block, and a subcarrier spacing for the PDCCH, wherein the multiplexing pattern is one of three multiplexing patterns, wherein the three multiplexing patterns include time division multiplexing (TDM), frequency division multiplexing (FDM) option 1 in which orthogonal frequency division multiplexing (OFDM) symbols of the PDCCH are prior to OFDM symbols of the SS/PBCH block, and FDM option 2 in which OFDM symbols of the PDCCH are a subset of OFDM symbols of the SS/PBCH block,
    wherein the transceiver is further configured to receive, from the BS, the PDCCH on the monitoring occasions based on the at least one parameter.

11. The UE of claim 10, wherein, when the multiplexing pattern is a first multiplexing pattern:
    the at least one parameter comprises a starting slot index for the PDCCH, and the processor is configured to identify the starting slot index for the PDCCH based on the index of SS/PBCH block, an offset indicated by a master information block (MIB) comprised in the SS/PBCH block, and a value of numerology indicated by a subcarrier spacing for the PDCCH.

12. The UE of claim 11, wherein:
the offset is from a set of candidate offsets, and
the set of candidate offsets comprises {0, 2, 5, 7} or {0, 2.5, 5, 7.5}.

13. The UE of claim 10, wherein:
when the multiplexing pattern is a first multiplexing pattern:
the at least one parameter comprises a first symbol index for the PDCCH, and
the processor is configured to identify the first symbol index based on a number of search space sets per slot, and
the number of search space sets per slot is 1 or 2.

14. The UE of claim 10, wherein, when the multiplexing pattern is a second multiplexing pattern or a third multiplexing pattern:
the at least one parameter comprises a slot index for the PDCCH, and
the processor is configured to identify the slot index for the PDCCH to be a same value as a slot index for the SS/PBCH block or a value of the slot index for the SS/PBCH block minus 1 based on a first subcarrier spacing for the SS/PBCH block, a second subcarrier spacing for the PDCCH, and the index of the SS/PBCH block.

15. The UE of claim 10, wherein, when the multiplexing pattern is a second multiplexing pattern or a third multiplexing pattern:
the at least one parameter comprises a first symbol index for the PDCCH, and
the processor is configured to identify the first symbol index for the PDCCH based on a first subcarrier spacing for the SS/PBCH block, a second subcarrier spacing for the PDCCH, and the index of the SS/PBCH block.

16. The UE of claim 15, wherein, when the multiplexing pattern is the second multiplexing pattern, the first subcarrier spacing value is 120 kHz, and the second subcarrier spacing value is 60 kHz:
the first symbol index is identified as 0, 1, 6, 7, when the index of the SS/PBCH block is equal to 4k, 4k+1, 4k+2, 4k+3, respectively, where k is an integer.

17. The UE of claim 15, wherein, when the multiplexing pattern is the second multiplexing pattern, the first subcarrier spacing value is 240 kHz, and the second subcarrier spacing value is 120 kHz:
the first symbol index is identified as 0, 1, 2, 3, 0, 1, when the index of the SS/PBCH block is equal to 8k, 8k+1, 8k+2, 8k+3, 8k+6, 8k+8, respectively, where k is an integer, and a slot index for the PDCCH is a same value as a slot index for the SS/PBCH block,
the first symbol index is identified as 12, 13, when the index of the SS/PBCH block is equal to 8k+4, 8k+5, respectively, where k is an integer, and the slot index for the PDCCH is a value of the slot index for the SS/PBCH block minus 1.

18. The UE of claim 15, wherein, when the multiplexing pattern is the third multiplexing pattern, the first subcarrier spacing value is 120 kHz, and the second subcarrier spacing value is 120 kHz:
the first symbol index is identified as 4, 8, 2, 6, when the index of the SS/PBCH block is equal to 4k, 4k+1, 4k+2, 4k+3, respectively, where k is an integer.

19. A base station (BS) in a wireless communication system, the BS comprising:
a processor configured to generate a synchronization signal/physical broadcasting channel (SS/PBCH) block,
a transceiver operably connected to the processor, the transceiver configured to:
transmit, to a user equipment (UE), the SS/PBCH block, wherein at least one parameter for monitoring occasions for a physical downlink control channel (PDCCH) is indicated based on a multiplexing pattern, an index of the SS/PBCH block, and a subcarrier spacing for the PDCCH, wherein the multiplexing pattern is one of three multiplexing patterns, wherein the three multiplexing patterns include time division multiplexing (TDM), frequency division multiplexing (FDM) option 1 in which orthogonal frequency division multiplexing (OFDM) symbols of the PDCCH are prior to OFDM symbols of the SS/PBCH block, and FDM option 2 in which OFDM symbols of the PDCCH are a subset of OFDM symbols of the SS/PBCH block; and
transmit, to the UE, the PDCCH on the PDCCH monitoring occasions based on the at least one parameter.

20. The BS of claim 19, wherein, when the multiplexing pattern is a first multiplexing pattern:
the at least one parameter comprises a starting slot index for the PDCCH, and
the starting slot index for the PDCCH is indicated based on the index of SS/PBCH block, an offset indicated by a master information block (MIB) comprised in the SS/PBCH block, and a value of numerology indicated by a subcarrier spacing for the PDCCH.

21. The BS of claim 20, wherein:
the offset is from a set of candidate offsets, and
the set of candidate offsets comprises {0, 2, 5, 7} or {0, 2.5, 5, 7.5}.

22. The BS of claim 19, wherein:
when the multiplexing pattern is a first multiplexing pattern:
the at least one parameter comprises a first symbol index for the PDCCH, and
the first symbol index is indicated based on a number of search space sets per slot, and
the number of search space sets per slot is 1 or 2.

23. The BS of claim 19, wherein, when the multiplexing pattern is a second multiplexing pattern or a third multiplexing pattern:
the at least one parameter comprises a slot index for the PDCCH, and
the slot index for the PDCCH is indicated to be a same value as a slot index for the SS/PBCH block or a value of the slot index for the SS/PBCH block minus 1 based on a first subcarrier spacing for the SS/PBCH block, a second subcarrier spacing for the PDCCH, and the index of the SS/PBCH block.

24. The BS of claim 19, wherein, when the multiplexing pattern is a second multiplexing pattern or a third multiplexing pattern:
the at least one parameter comprises a first symbol index for the PDCCH, and
the first symbol index for the PDCCH is indicated based on a first subcarrier spacing for the SS/PBCH block, a second subcarrier spacing for the PDCCH, and the index of the SS/PBCH block.

25. The BS of claim 24, wherein, when the multiplexing pattern is the second multiplexing pattern, the first subcarrier spacing value is 120 kHz, and the second subcarrier spacing value is 60 kHz:
the first symbol index is indicated as 0, 1, 6, 7, when the index of the SS/PBCH block is equal to 4k, 4k+1, 4k+2, 4k+3, respectively, where k is an integer.

26. The BS of claim 24, wherein, when the multiplexing pattern is the second multiplexing pattern, the first subcarrier spacing value is 240 kHz, and the second subcarrier spacing value is 120 kHz:
the first symbol index is indicated as 0, 1, 2, 3, 0, 1, when the index of the SS/PBCH block is equal to 8k, 8k+1, 8k+2, 8k+3, 8k+6, 8k+8, respectively, where k is an integer, and a slot index for the PDCCH is a same value as a slot index for the SS/PBCH block,
the first symbol index is indicated as 12, 13, when the index of the SS/PBCH block is equal to 8k+4, 8k+5, respectively, where k is an integer, and the slot index for the PDCCH is a value of the slot index for the SS/PBCH block minus 1.

27. The BS of claim 24, wherein, when the multiplexing pattern is the third multiplexing pattern, the first subcarrier spacing value is 120 kHz, and the second subcarrier spacing value is 120 kHz:
the first symbol index is indicated as 4, 8, 2, 6, when the index of the SS/PBCH block is equal to 4k, 4k+1, 4k+2, 4k+3, respectively, where k is an integer.

* * * * *